(12) United States Patent
Arnetoli

(10) Patent No.: US 11,234,363 B2
(45) Date of Patent: Feb. 1, 2022

(54) TRIMMER HEAD WITH MEMBERS FOR SIMPLIFYING THE LOADING OF THE CUTTING LINE

(71) Applicant: ARNETOLI MOTOR S.R.L., Reggello (IT)

(72) Inventor: Fabrizio Arnetoli, Reggello (IT)

(73) Assignee: ARNETOLI MOTOR S.R.L., Reggello (IT)

( * ) Notice: Subject to any disclaimer, the term of this patent is extended or adjusted under 35 U.S.C. 154(b) by 48 days.

(21) Appl. No.: 16/898,724

(22) Filed: Jun. 11, 2020

(65) Prior Publication Data
US 2020/0296888 A1    Sep. 24, 2020

Related U.S. Application Data

(63) Continuation of application No. 15/141,210, filed on Apr. 28, 2016, now abandoned.

(30) Foreign Application Priority Data

Oct. 1, 2015 (IT) .................. 102015000057357

(51) Int. Cl.
*A01D 34/416* (2006.01)

(52) U.S. Cl.
CPC .................. *A01D 34/4166* (2013.01)

(58) Field of Classification Search
CPC ................ A01D 34/4166; B65H 75/44
See application file for complete search history.

(56) References Cited

U.S. PATENT DOCUMENTS 3,184,180 A * 5/1965 Rockwell ............. B65H 75/38
242/399.2

FOREIGN PATENT DOCUMENTS

JP    05168328 A * 7/1993 ......... A01D 34/4162

* cited by examiner

*Primary Examiner* — Kenneth E Peterson
*Assistant Examiner* — Liang Dong
(74) *Attorney, Agent, or Firm* — McGlew and Tuttle, P.C.

(57) ABSTRACT

The trimmer head (1) includes: an axis of rotation (A-A); a housing (3); a spool (13) insertable in the housing, configured and arranged to wind a stock of cutting line (F) therearound. The spool includes flanges (13A, 13B), between which anchoring elements (15) extend to anchor the cutting line.

16 Claims, 23 Drawing Sheets

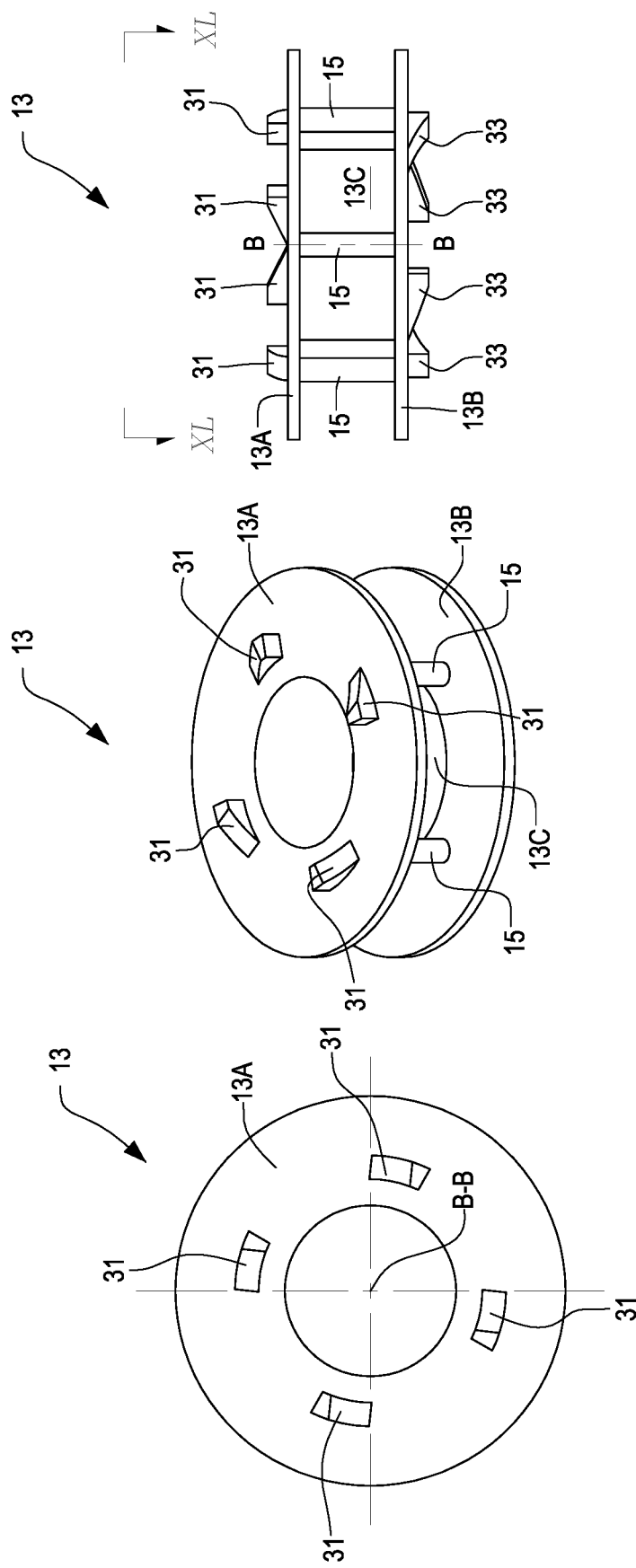

TRIMMER HEAD WITH MEMBERS FOR SIMPLIFYING THE LOADING OF THE CUTTING LINE

CROSS REFERENCE TO RELATED APPLICATIONS

This application is a continuation under 37 CFR 1.53(b) of pending prior U.S. patent application Ser. No. 15/141,210 filed Apr. 28, 2016, which claims the priority of Italian Application 102015000057357, filed Oct. 1, 2015, the entire contents of each application are incorporated herein by reference.

FIELD OF THE INVENTION

The present invention relates to the field of gardening products. More in particular, the invention relates to improvements to trimmer heads for brush cutters or the like, using a line made for example of plastic as a vegetation cutting member.

BACKGROUND OF THE INVENTION

In the field of gardening equipment for use at both amateur and professional level, the use is well known of trimmer heads applied at the end of a drive shaft of a brush cutter or other equipment, to cut vegetation. Some trimmer heads of this type use a line made of synthetic resin, typically polyamide, to cut the vegetation. Usually, the line is wound inside the trimmer head to form a stock and exits from one or more holes provided in a housing of the trimmer head, inside which a spool is usually provided forming a stock of cutting line. During use, the cutting line wears and breaks. Therefore, a length of the cutting line projecting through the passage holes of the housing shall be periodically replaced, so as to have a sufficient quantity of cutting line outside the housing of the trimmer head.

There are numerous trimmer heads of this type, that differ from one another for instance in the way the cutting line stock is accumulated inside the housing and in the way the cutting line is supplied from the housing to replace the cutting line length projecting from the head following that has worn or has broken during use.

In some cases, to restore the line stock inside the head, it is necessary to open the housing, to extract the spool contained therein, to anchor a cutting line to the spool, and to wind a suitable length of cutting line around the spool. The spool is then inserted again in the housing, the line end or ends are made pass through the line passage hole(s) from the inside to the outside of the housing, and the housing is then closed. This operation is long and complex. Trimmer heads have been therefore developed, wherein the cutting line is diametrically inserted through the housing, without the need for opening the housing, and is inserted in a diameter passage of the spool. The spool is then rotated with respect to the housing, so as to form in the spool a series of line turns that form the stock of cutting line for the subsequent operation.

These systems, even if more practical than those requiring to open the housing to replace the cutting line, have some drawbacks due to the difficulty in passing the cutting line through the spool hole.

There is therefore a need to provide a trimmer head of the type described above, that alleviates or overcomes the drawbacks of the current trimmer heads.

SUMMARY OF THE INVENTION

According to an aspect, a trimmer head is provided comprising: a rotation axis; a housing; a spool insertable in the housing, configured and arranged to wind a cutting line stock therearound. The spool comprises at least a first flange extending around a spool axis. The housing comprises at least two cutting line passage holes, which are preferably arranged in approximately diametrically opposite positions and through which the cutting line passes from the inside to the outside of the housing. To allow the cutting line to be simply and quickly anchored to the spool without the need for opening the housing, for example when it is necessary to load a cutting line stock in the spool, this latter comprises at least one cutting line anchoring element extending from the first flange and spaced from the spool axis. The anchoring element may be shaped like a column or a pin with a circular cross-section, or may have an elongated shape or any other suitable shape, and may extend nearly parallel to the spool axis.

With such a structure, when it is necessary to load a cutting line stock on the spool, the line is inserted through one of the two cutting line passage holes provided in the head and is pushed through the housing, until it exits from the opposite cutting line passage hole. The line passes between the spool axis and the anchoring element, which is in an off-axis position. In this way, by rotating the spool with respect to the housing, the cutting line remains anchored to the spool and can be wound.

As it will be clearly apparent from the detailed description below of some embodiments of the invention, with this system it is possible to replace the cutting line very easily. In particular, a system for line replacement may be provided that does not require positioning the spool angularly with respect to the outer housing. The line can be anchored to the spool independently of the spool angular position with respect to the housing (and therefore especially with respect to the cutting line passage holes thereof through which the line passes).

The spool may have only one flange. However, in some embodiments the spool preferably has two flanges, which are spaced from each other in axial direction and between which a space is provided, where the stock of cutting line is wound. In advantageous embodiments, the cutting line anchoring element may extend from one flange to the other flange.

Even if one anchoring element is sufficient, in order to achieve a more efficient anchoring and a dynamically more balanced spool, in some embodiments the spool may comprise a plurality of anchoring elements for the cutting line, which are angularly spaced from each other, extend from the first flange and are spaced from the spool axis.

In some embodiments, the spool may comprise a central wall surrounding the spool axis and extending from the first flange about parallel to the spool axis. The wall may be cylindrically shaped, and for instance a line elongation mechanism, known in se, or a pin for connecting the trimmer head to a drive shaft of a brush cutter or similar equipment, may be housed therein. In this case, the cutting line anchoring elements may be associated with the wall. In some embodiments described herein, the anchoring elements may be radially more distanced than the wall from the spool axis, i.e. they may be arranged outside the wall. In other embodiments, the anchoring elements may be integrated into the wall.

In some particularly advantageous embodiments, in order to facilitate the exit of the cutting line from the cutting line passage hole opposite to the cutting line passage hole through which the line is inserted, guides may be associated with at least one of the cutting line passage holes, converging towards the cutting line passage hole. The guides may have a curved extension on a plane substantially orthogonal to the axis of the trimmer head and of the spool, when it is mounted in the head. The curved guides facilitate the insertion of the cutting line in the cutting line passage hole opposite to the cutting line passage hole from which the leading end of the line has been introduced in the trimmer head. A pair of converging guides is preferably associated with each cutting line passage hole.

In some embodiments, the guides may be made in a single piece with the housing, for instance in a tangential wall of the housing, where also the cutting line passage holes are provided. In other embodiments, the guides may be provided on inserts separate from the housing, which are then inserted in the housing and locked in it. The inserts may form, for example, bushes for the cutting line passage, which are inserted in the cutting line passage holes provided in the housing.

Further advantageous embodiments and further features of the trimmer head are set forth in the attached dependent claims and will be described below with reference to embodiments illustrated in the attached drawings.

According to a further aspect, a method is provided to wind a cutting line stock in a trimmer head, having a rotation axis, a housing with at least two cutting line passage holes and a spool housed in the housing and comprising at least a first flange, and at least one cutting line anchoring element, which extends from the first flange about parallel to the rotation axis and is spaced from the spool axis; the method comprising the following steps:

inserting an end of the cutting line through one of said at least two cutting line passage holes,
  guiding the line end between the rotation axis of the trimmer head and the anchoring element, towards the second of said two cutting line passage holes;
  inserting the cutting line end through the second cutting line passage holeand making the cutting line end exiting from the housing through the second cutting line passage hole;
  sliding an amount of cutting line through the housing;
  winding a length of the cutting line on the spool by rotating the spool inside the housing with respect to the two cutting line passage holes, so as to form a series of line turns on the spool, wound around said at least one anchoring element, so as to constrain the cutting line to the spool at an intermediate portion of said line length, leaving two line segments projecting outside the housing through the two cutting line passage holes.

According to the present invention, a method is provided to wind a stock of cutting line in a trimmer head having an axis of rotation, a housing with at least two cutting line passage holes, and a spool housed in the housing and comprising at least a first flange and at least one anchoring element for the cutting line extending from the first flange approximately parallel to the rotation axis and spaced from the spool axis. The method comprising the following steps:

inserting an end of the cutting line through one of the at least two cutting line passage holes;
  guiding the line end between the rotation axis of the trimmer head and the anchoring element, towards the second of the two cutting line passage holes;
  inserting the cutting line end through the second cutting line passage hole and making it exit from the housing through the second cutting line passage hole;
  sliding a quantity of cutting line through the housing;
  winding a length of the cutting line on the spool by rotating the spool inside the housing with respect to the two cutting line passage holes, so as to form, on the spool, a series of line turns wound around the at least one anchoring element, so as to constrain the cutting line to the spool at an intermediate portion of the length of cutting line, leaving two line segments projecting outside the housing through the two cutting line passage holes.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 38 is a side view of a further modified embodiment of a spool for a trimmer head according to the invention;

FIG. 39 is an isometric view of the spool of FIG. 38;

FIG. 40 is a plan view according to XL-XL of FIG. 38;

DESCRIPTION OF THE PREFERRED EMBODIMENTS

Figure 1:
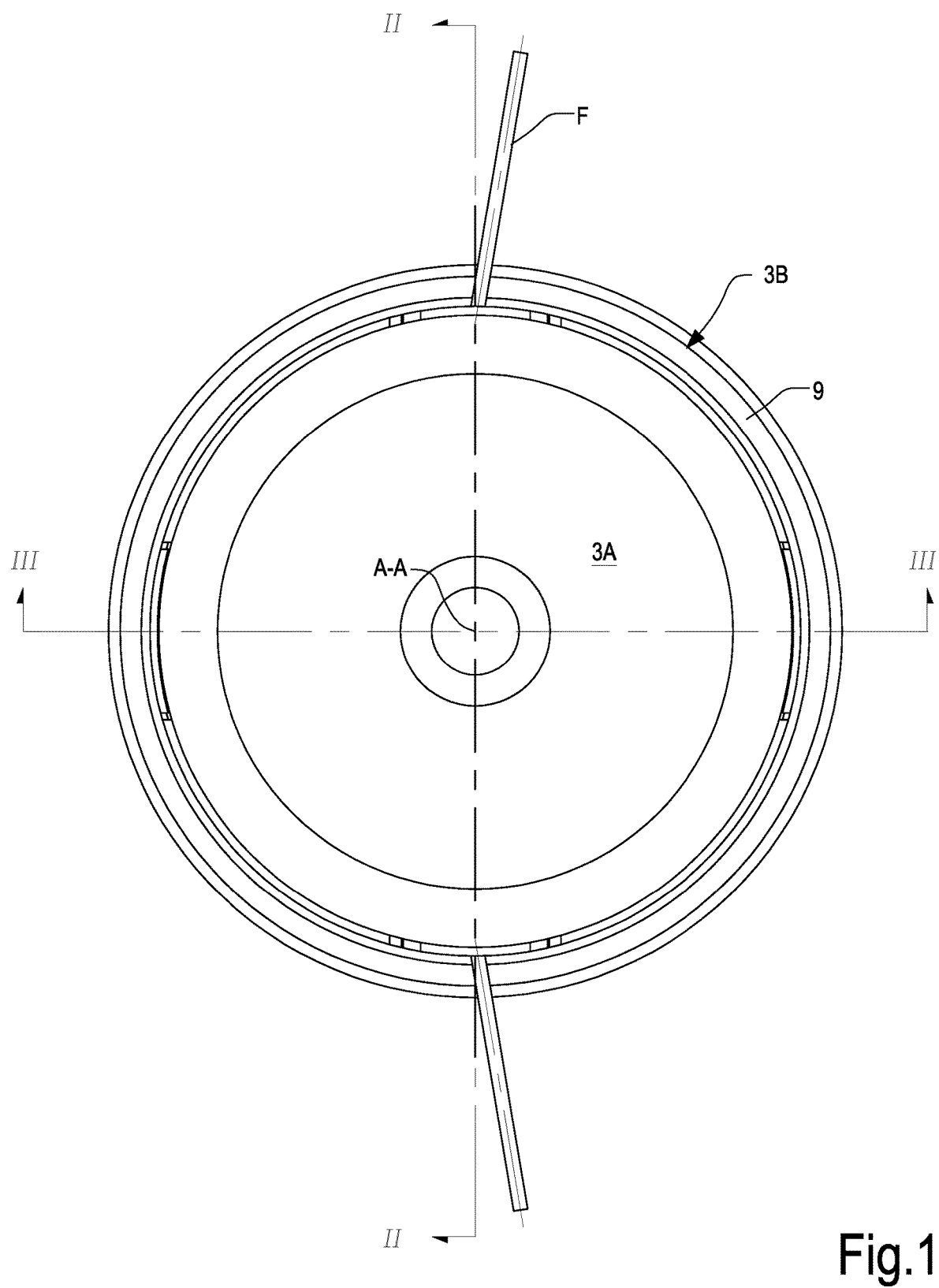
FIG. 1 is a plan view of an embodiment of a trimmer head.
Figure 2:
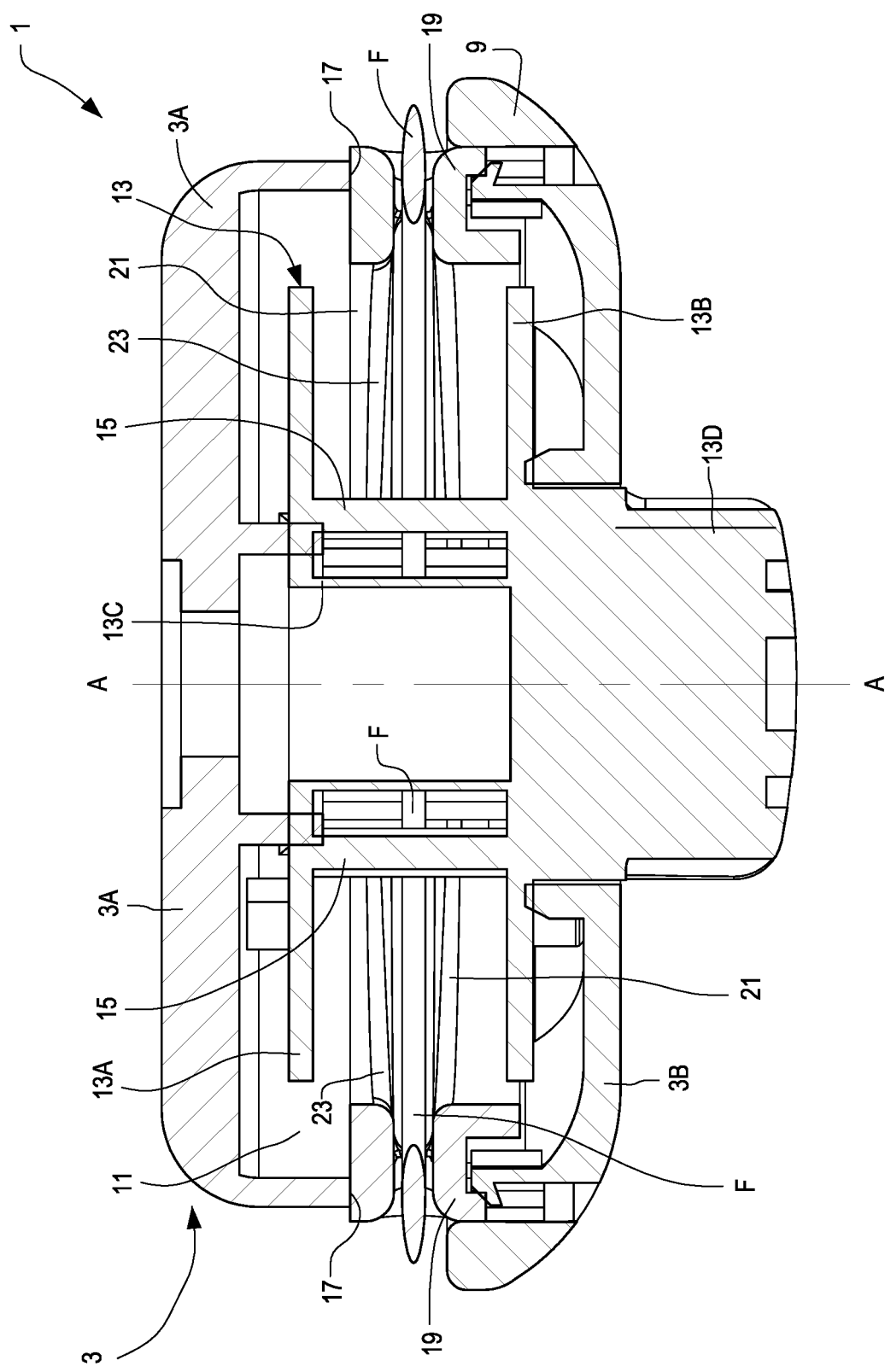
FIG. 2 is a diameter section view according to line II-II of FIG. 1.
Figure 3:
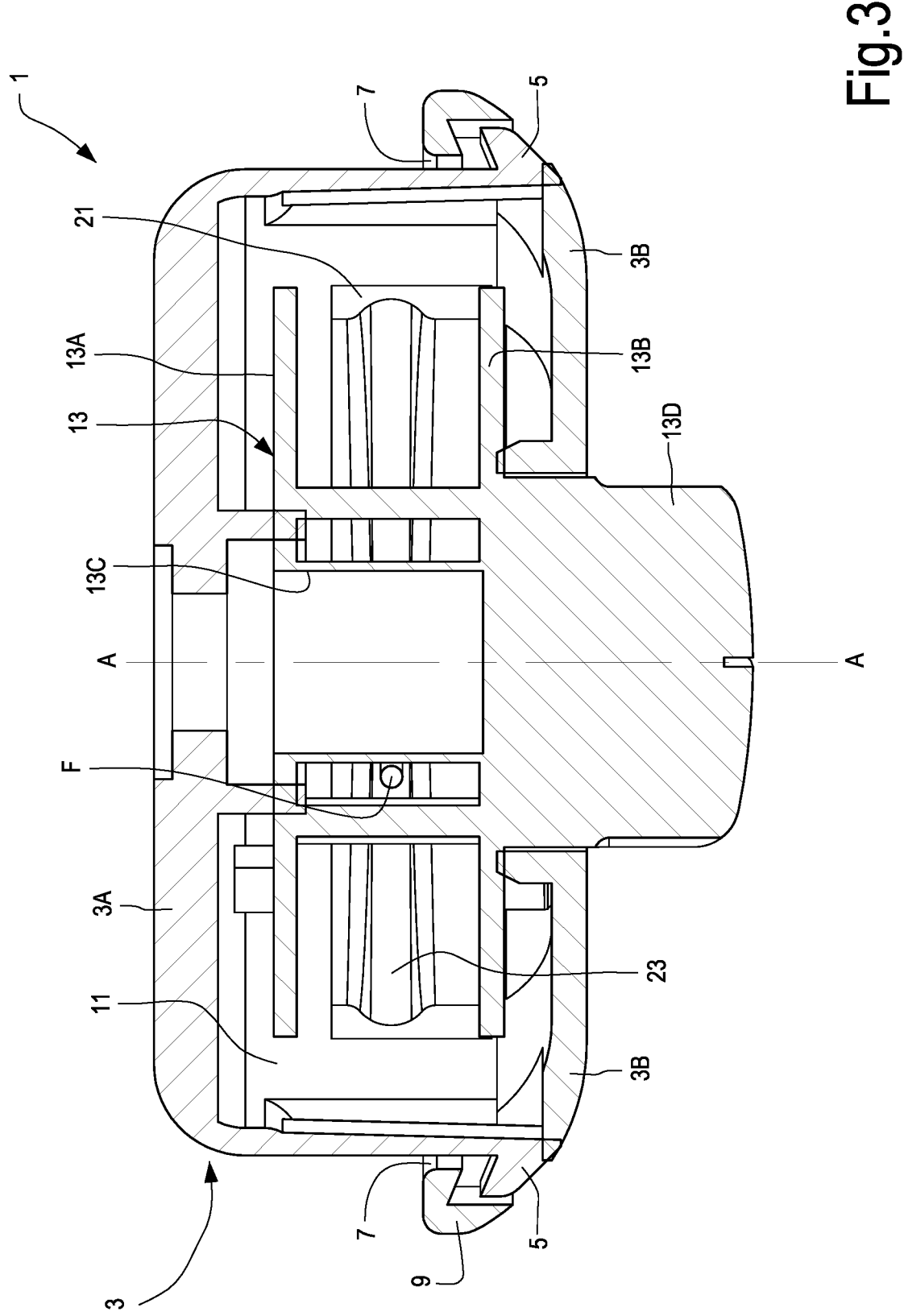
FIG. 3 is a diameter section view according to line III-III of FIG. 1.
Figure 4:
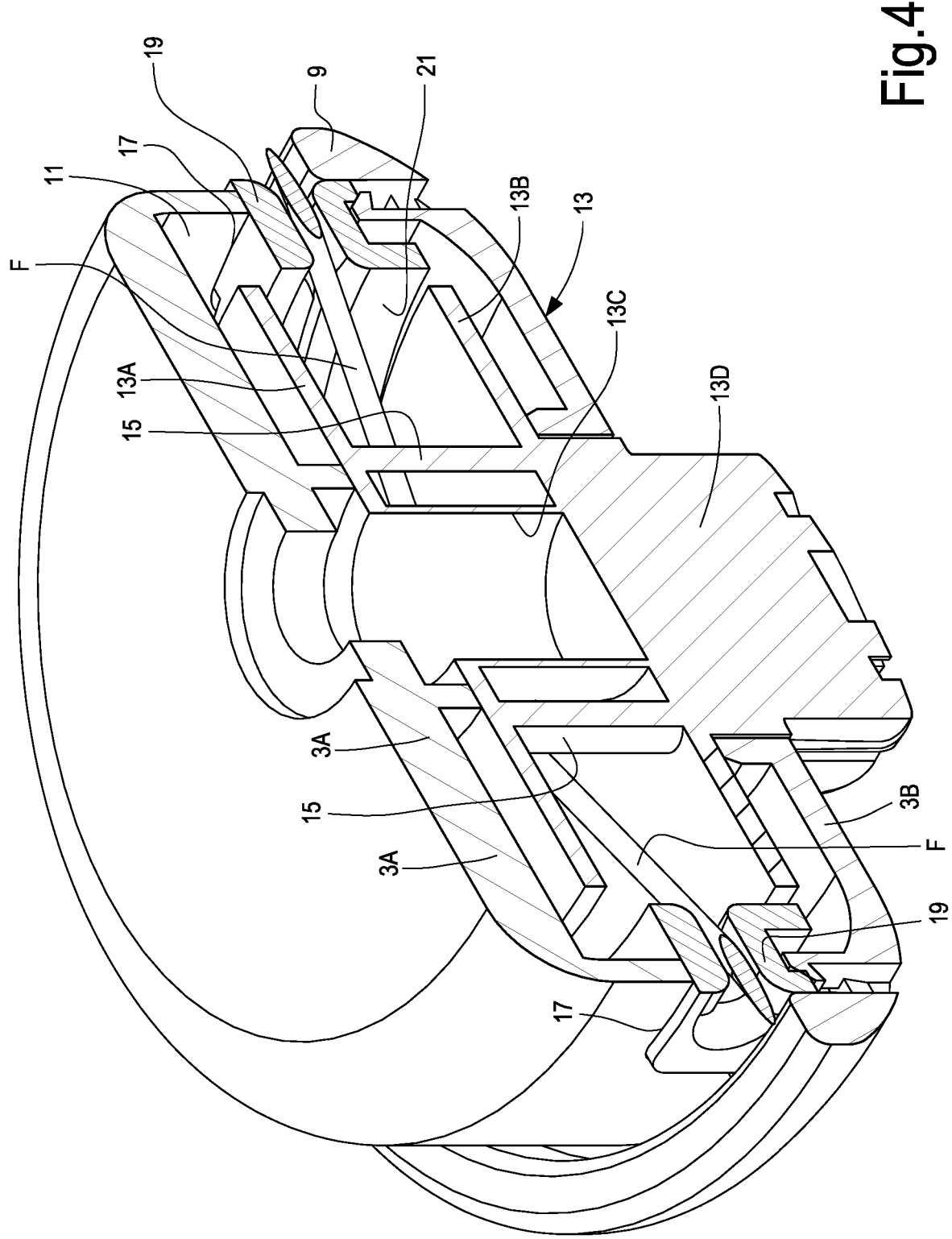
FIG. 4 is an isometric view of the head of FIGS. 1 to 3.
Figure 5:
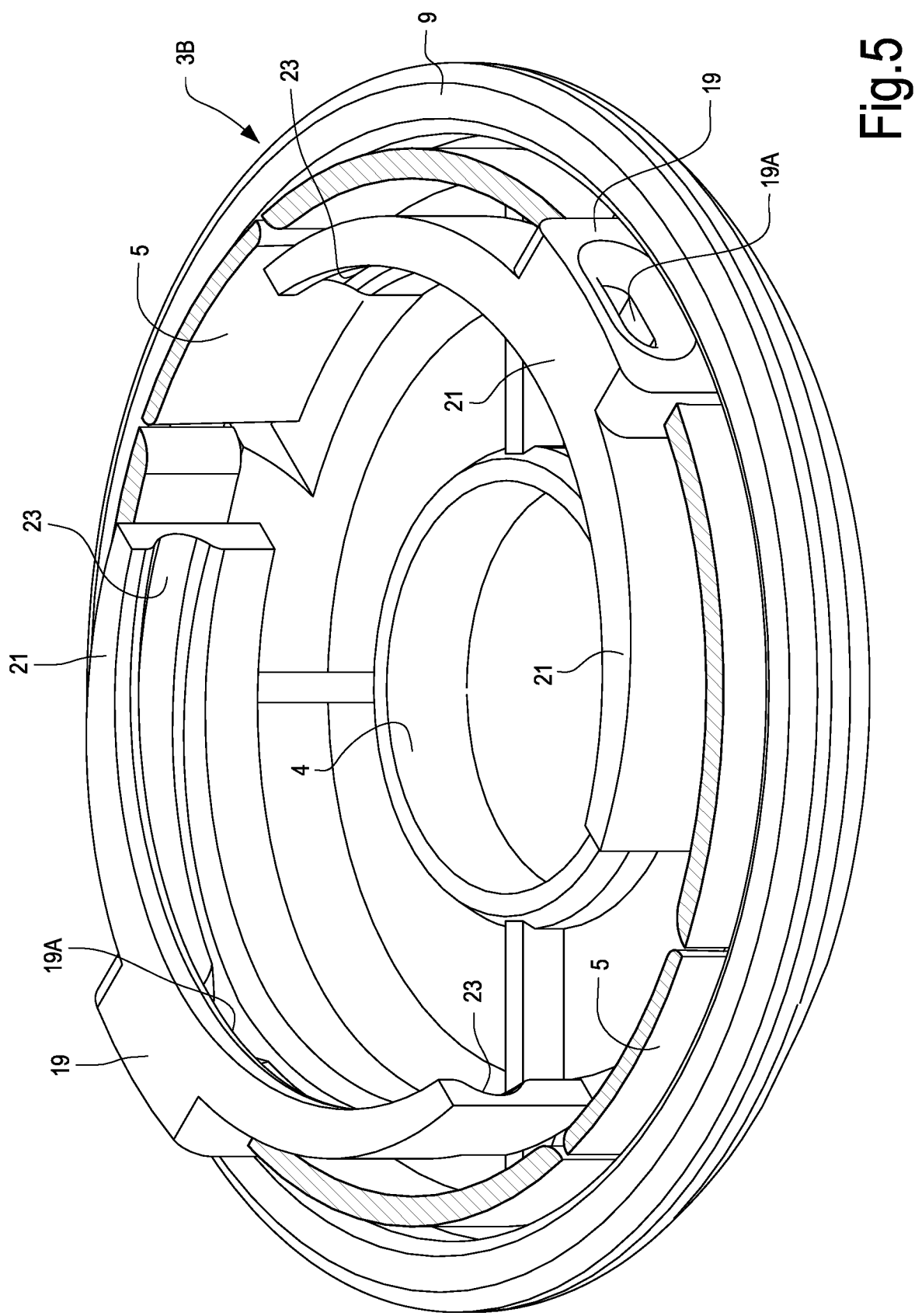
FIG. 5 is an isometric view of the head of FIGS. 1 to 4, wherein the upper portion of the housing and the line spool have been partially removed.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

A first embodiment of a trimmer head according to the invention will be described below with specific reference to FIGS. 1 to 6.

In this embodiment, the trimmer head is indicated as a whole with number 1. It has a housing 3, which can comprise an upper part 3A and a lower part 3B. In the illustrated embodiment, the upper part 3A and the lower part 3B are snap-coupled together, for example by means of elastic tabs 5 which can be integral with the upper part 3A, and slots 7 which can be provided in an edge 9 of the lower part 3B of the housing 3. It should be understood that the method for coupling together the two parts or portions 3A, 3B of the housing 3 may be different than those illustrated, and that any means can be used, suitable for coupling together the two portions 3A, 3B of the housing 3, so that the two portions are axially and torsionally joined during the operation of the trimmer head.

A-A indicates a head rotation axis, around which the trimmer head rotates when it is connected to a brush cutter or similar machine (not shown).

A space 11 is provided inside the housing 3 of the trimmer head 1, inside which space a spool 13 can be inserted. Even if in the embodiment of FIGS. 1 to 6 the housing 3 is comprised of two halves coupled together and surrounding the spool completely (with the exception of a control knob, described below), it is also possible that the housing is open and the spool, for instance a flange thereof, forms the housing closing element.

In the illustrated embodiment, the spool 13 comprises a flange 13A, a flange 13B and a central wall 13C, which in this example is approximately cylindrical and extends parallel to a spool axis B-B from one to the other of the two flanges 13A, 13B. When assembled, i.e. when the spool 13 is housed in the space 11 inside the housing 3, the axis B-B of the spool 13 may coincide with the rotation axis A-A of the trimmer head 1.

In the illustrated embodiment, the spool 13 furthermore comprises a button or knob 13D, projecting from the outer surface of the flange 13B, i.e. from the surface opposite to the surface facing the flange 13A of the spool 13. The button or knob 13D projects through a central hole 4 (FIG. 5) provided in the lower portion 3B of the housing 3, and constitutes an actuating member to supply cutting line wound around the spool 13 and/or to facilitate the winding of the cutting line around the spool 13 when it is necessary to restore a line stock on the spool, as will be better explained below.

Linear elements, in the form of pegs or pins 15, extend between the flange 13A and the flange 13B; in the illustrated embodiment, the pins are shaped like columns or posts with substantially circular cross-section extending substantially parallel to the spool axis B-B. As it is better shown in FIGS. 6(A)-6(C), in the illustrated embodiment four pins 15 are provided, arranged along a circumference concentric with the axis B-B, for instance at a constant angular pitch of 90°. The distance of the pegs or pins 15, i.e. the radius of the circle along which the pins 15 are aligned, is greater than the outer radial dimension of the central wall 13C, so as to leave a space between each pin 15 and the outer surface of the central wall 13C of the spool 13 extending coaxially with the spool axis.

In the illustrated embodiment, the housing 3 has two cutting line passage holes 17 for the cutting line schematically indicated with F that is wound around the spool 13 in the way described below.

In the embodiment of FIGS. 1 to 6, bushes 19 are inserted inside the passage holes 17 for the cutting line F. In some embodiments (not shown), the bushes may be made of metal and may have a substantially cylindrical shape. Vice versa, in the embodiment illustrated in FIGS. 1 to 6, each bush 19 forms an integral part of a respective component 21 forming perimeter guides 23 for the head or leading end of the cutting line. More in particular, as shown in detail in FIG. 5, where the portion 3A of the housing 3 has been partially removed and where also the spool 13 has been removed, each insert 21 has curved arms that can be substantially symmetrical with respect to the central part forming the respective bush 19. Each curved arm has a respective groove extending on the surface of the curved arm facing the inside of the housing, i.e. facing towards the rotation axis A-A of the trimmer head 1. The grooves define the guides 23, which converge in a passage opening 19A provided in the bush 19. In short, the guides 23 of each insert 21 converge towards the axis of the line passage opening 19A. As it will be better explained with reference to the sequence of FIGS. 6(A)-6(C), the guides 23 provided in the inserts 21 facilitate the insertion of the cutting line F when a cutting line stock begins being wound inside the trimmer head 1.

Figure 6A:
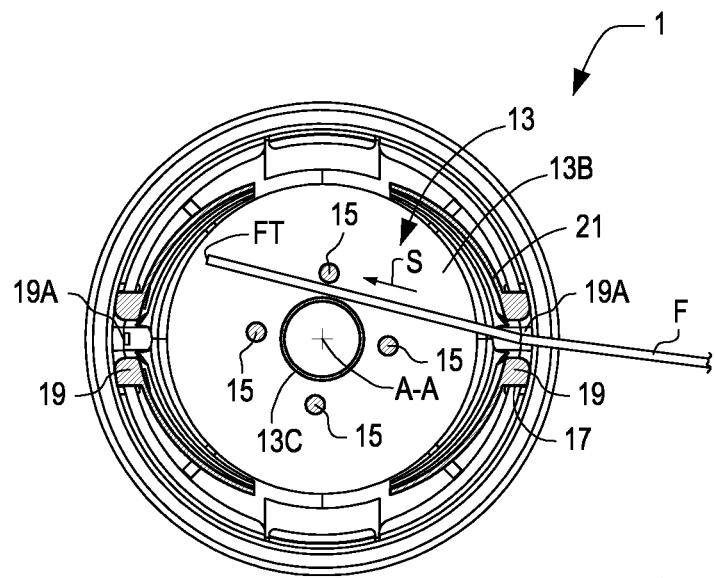
FIG. 6A is a view of a part of a sequence to insert the cutting line into the head of FIGS. 1 to 5.
Figure 6B:
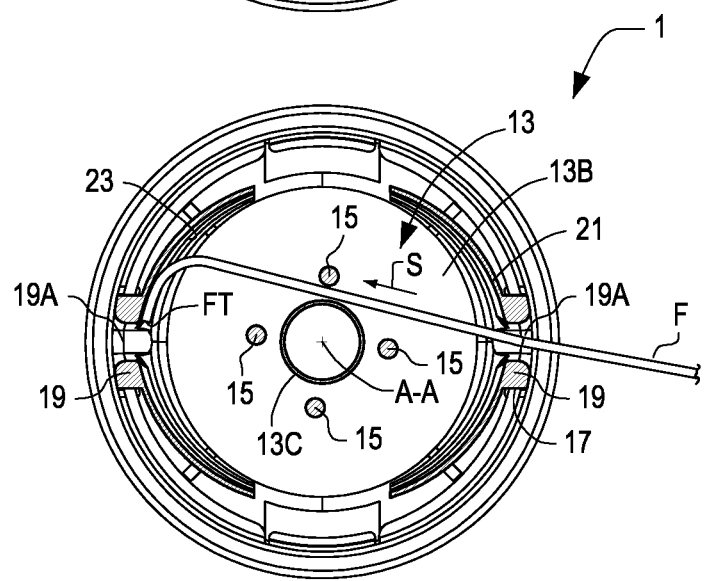
FIG. 6B is a view of another part of the sequence to insert the cutting line into the head of FIGS. 1 to 5.
Figure 6C:
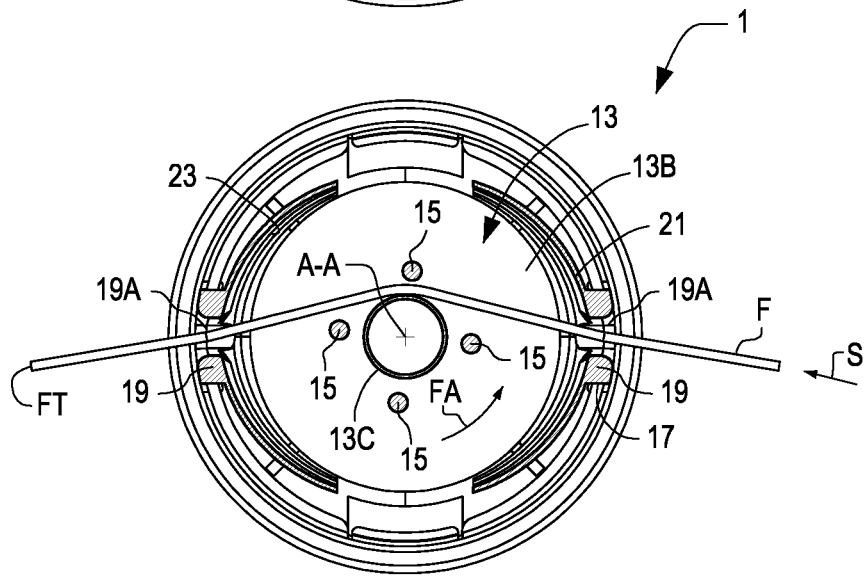
FIG. 6C is a view of yet another part of the sequence to insert the cutting line into the head of FIGS. 1 to 5.

With a trimmer head 1 structured as described above, the loading of a stock of cutting line F inside the housing 3 and around the spool 13 is particularly easy, even without opening the housing 3, and may be done according to the sequence of FIGS. 6(A)-6(C). These figures schematically illustrate a cross-section of the housing 3 and of the spool 13 according to a plane orthogonal to the axis A-A and arranged in an intermediate position between the flanges 13A, 13B of the spool 13.

The cross-sections of FIGS. 6(A)-6(C) show the flange 13 of the spool 13 and, in sectional view, the inserts 21, the bushes 19, the pegs or pins 15 and the central wall 13C of the spool 13. F indicates the cutting line, and FT indicates the head or leading end thereof.

FIG. 6A shows a first insertion step of the leading end FT of the cutting line F through one of the passage holes 17 provided in the housing 3 and inside which the bushes 19 are inserted, forming the passage openings 19A for the cutting line F. By inserting the cutting line F through the opening 19A of a bush 19, the leading end FT thereof penetrates according to a substantially diameter direction, touching the central wall 13C of the spool 13 and being laterally diverted thereby. Consequently, the leading end FT of the cutting line F passes between the wall 13C and one of the pins 15.

By pushing the cutting line F according to arrow S, the leading end FT achieves one of the perimeter guides 23 formed by the insert 21 provided in the housing 3 on the opposite side with respect to the opening 19A through which the cutting line F has been inserted. The guide 23 causes the diversion of the leading end FT of the cutting line F towards the opening 19A of the bush 19, opposite to the bush 19 where the line enters.

FIG. 6B shows how, due to the interaction between the leading end FT of the cutting line F and the opposite guide 23, the initial part of the cutting line F is bent and diverted towards the opposite passage opening 19A.

When the leading end FT of the cutting line F, continuing to move according to arrow S, achieves the edge of the opening 19A opposite to the opening 19A through which the cutting line F has been inserted, the leading end FT penetrates the opening 19A and crosses it, exiting from the housing 3 of the head 1 at the side opposite to the insertion side.

When the cutting line F has achieved the position of FIG. 6C, it can be drawn from the leading end FT until a sufficient length thereof is extracted. If the cutting line is taken from a reel of great length, it is possible to cut, from the supply reel, a line stock of sufficient length (for instance some meters) to ensure a prolonged use of the trimmer head 1. The cutting line F, cut to-measure, is arranged with respect to the head 1 so as to project through the two passage holes 17 by a same entity.

When this condition has been achieved, i.e. when two substantially equal segments—even some meters long—of cutting line F may project from the trimmer head 1, the cutting line is wound in the spool 13 by rotating the spool 13 with respect to the housing 3, for instance keeping the housing 3 with one hand and acting with the other hand on the knob 13D projecting from the housing 3.

In FIG. 6(C), arrow FA represents the rotation of the spool 13 inside the housing 3. When the spool 13 rotates according to arrow FA around the axis A-A of the trimmer head 1, the cutting line F begins to wind around the pegs or pins 15 and the central wall 13C, remaining anchored, at its central position, to the spool 13 thanks to the same pins 15, so as to form a stock of line turns in the spool 13, the two lengths of cutting line F projecting form the holes 17 being gradually drawn inside the trimmer head 1. Winding continues until from the housing 3 two segments of line F project, which have a length suitable for the head operation, for instance some tens of centimeters.

From the above description it is clearly apparent that re-loading the cutting line F in the head 1 can be fast and easy in that on the one hand it is not necessary to open the housing 3, and moreover it is also not necessary to guide the leading end FT of the cutting line F precisely inside a hole or a passage provided in the spool 13. Contrariwise, it is sufficient to insert the leading end FT of the cutting line F through the entrance opening 19A and to push it through the inside space of the housing 3 so that it exits from the opposite openings 19A. The leading end FT of the cutting line F is inserted between a pin 15 and the outer surface of the central wall 13C and, guided by one of the guides 23, it achieves and passes through the opening 19A opposite to the entrance opening.

By arranging the guides 23 at both openings 19A, it is possible to insert the cutting line F in one or in the other of the two openings 19A. In other less advantageous embodiments, the guides 23 may be arranged at only one of the two openings 19A, for example providing a sign on the outer surface of the housing 3, allowing the user to identify which of the two openings 19A shall be used to insert the leading end FT of the cutting line F, i.e. the opening opposite that with which the guides 23 are associated. The use of a double pair of guides 23 is however preferred, due to both a greater convenience in use as well as for dynamic reasons, as the trimmer head 1 is more balanced.

The trimmer head 1 may be provided with any suitable mechanism for line winding and unwinding, known per se and not described below.

Figure 7A:
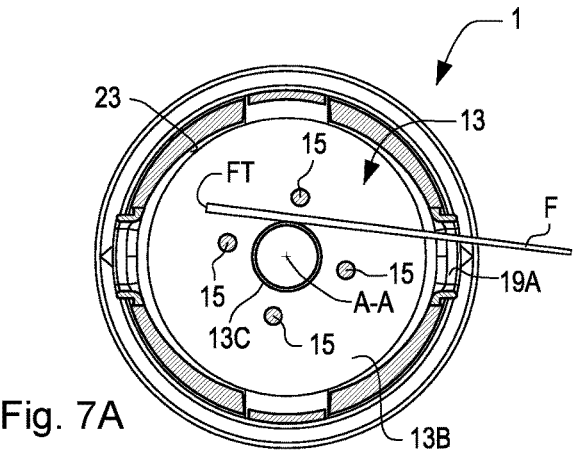
FIG. 7A is a view of a portion of an operative sequence for line replacement in a modified embodiment.
Figure 7D:
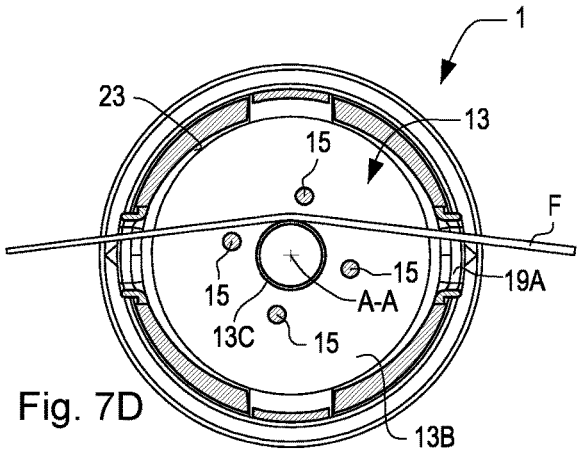
FIG. 7D is a view of yet another portion of the operative sequence for line replacement in the modified embodiment.
Figure 7B:
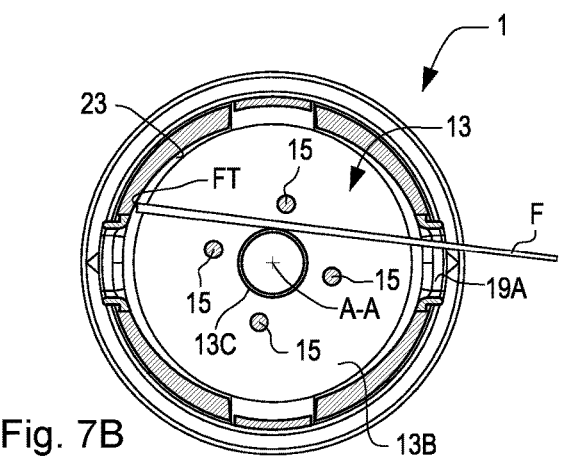
FIG. 7B is a view of another portion of the operative sequence for line replacement in the modified embodiment.
Figure 7E:
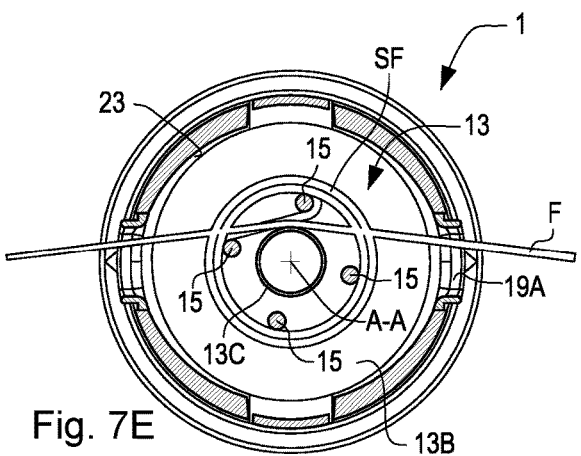
FIG. 7E is a view of yet another portion of the operative sequence for line replacement in the modified embodiment.
Figure 7C:
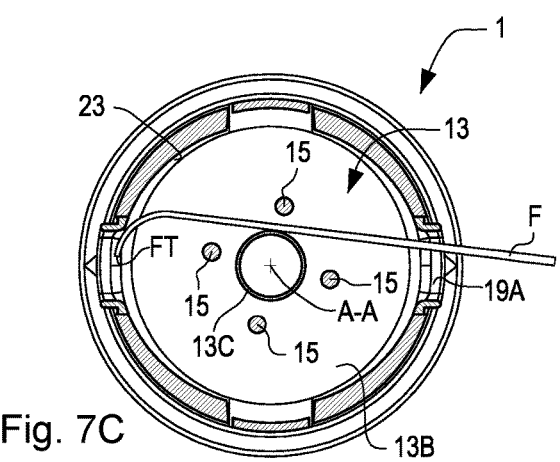
FIG. 7C is a view of yet another portion of the operative sequence for line replacement in the modified embodiment.
Figure 8A:
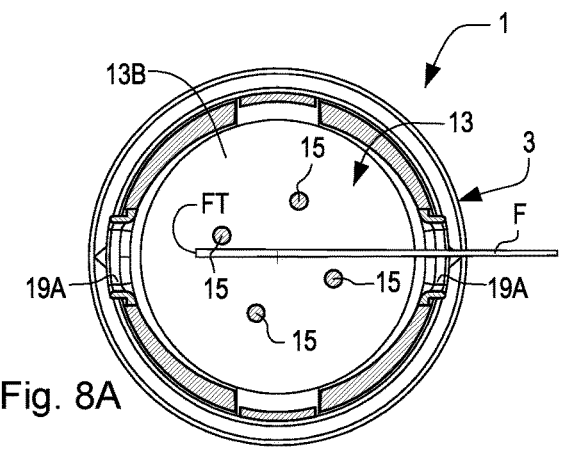
FIG. 8A is a view of a portion of an operative sequence for line replacement in yet another modified embodiment.
Figure 8D:
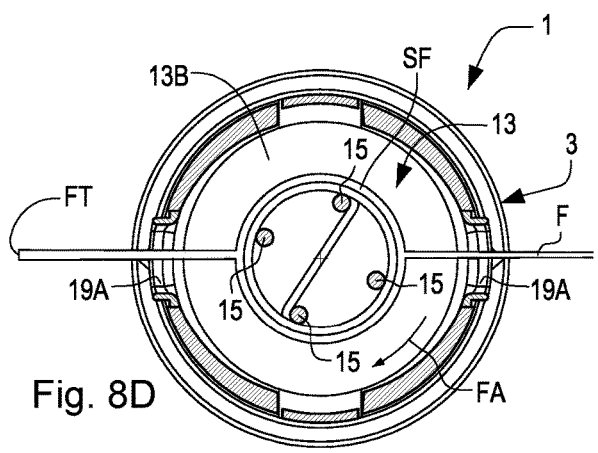
FIG. 8D is a view of yet another portion of the operative sequence for line replacement in the yet another modified embodiment.
Figure 8B:
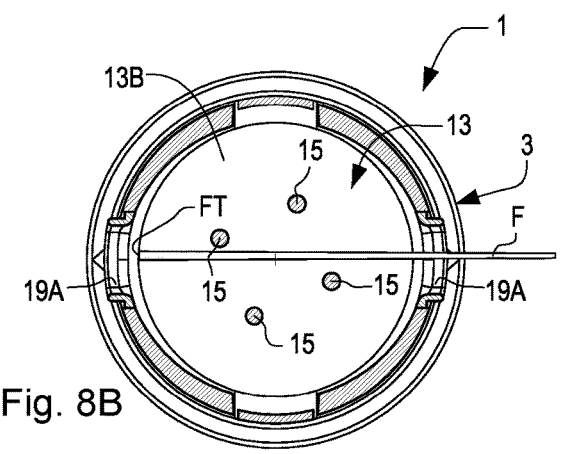
FIG. 8B is a view of another portion of the operative sequence for line replacement in the yet another modified embodiment.
Figure 8C:
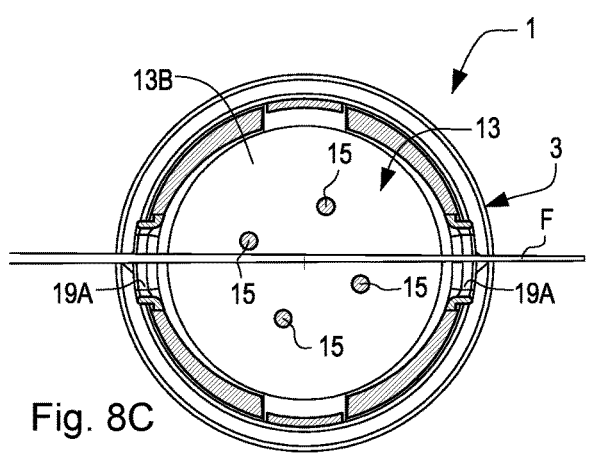
FIG. 8C is a view of yet another portion of the operative sequence for line replacement in the yet another modified embodiment.

The sequence of FIGS. 7(A)-7(E) show the same operation for introducing the line in a modified embodiment, wherein the guides 23 for the leading end FT of the cutting line F are configured differently. In the embodiment illustrated in FIGS. 7(A) and 7(B), the guides 23 are integrally formed with the side wall of the housing 3. The side wall of the housing 3 has holes inside which bushes are inserted, which are made, for example, of metal and in which the openings 19A are provided. In this case the openings may have a size greater than that shown in FIGS. 6(A)-6(C) and are made as components separate from the guides 23. The sequence for the insertion of the cutting line F is otherwise substantially equal to that described above with reference to FIGS. 6(A)-6(C). FIG. 7(E) shows turns SF of cutting line F wound around the axis A-A of the trimmer head 1.

While in the figures described above the spool 13 is provided with a central wall 13C that can be substantially cylindrical and coaxial with the spool axis B-B, in other embodiments the spool 13 may be devoid of said wall. The central wall 13C may be provided or dispensed with depending, for example, on the type of trimmer head 1 where the spool 13 shall be inserted.

Even if no central wall 13C is provided, the stock of cutting line F may be wound as described above, inserting the leading end FT of the cutting line F without opening the housing 3.

The sequence of FIGS. 8(A)-8(D) shows the way to insert and to start winding the cutting line F in a trimmer head 1, wherein the spool 13 is devoid of a central wall 13C. In this case, the cutting line F may be more easily inserted because there are no axial obstacles. The leading end FT of the cutting line F penetrates in a substantially diameter direction, thus more easily achieving the opening 19A opposite to the entrance opening 19A, as clearly apparent from FIGS. 8(A)-8(C). Once the position of FIG. 8(C) has been achieved, wherein the cutting line F projects by substantially the same length from the two openings 19A, it is possible to rotate the spool 13 with respect to the housing 3 inside which it is placed, for instance according to arrow FA, so as to form turns SF of cutting line F, forming the line stock for the trimmer head 1.

Figure 9:
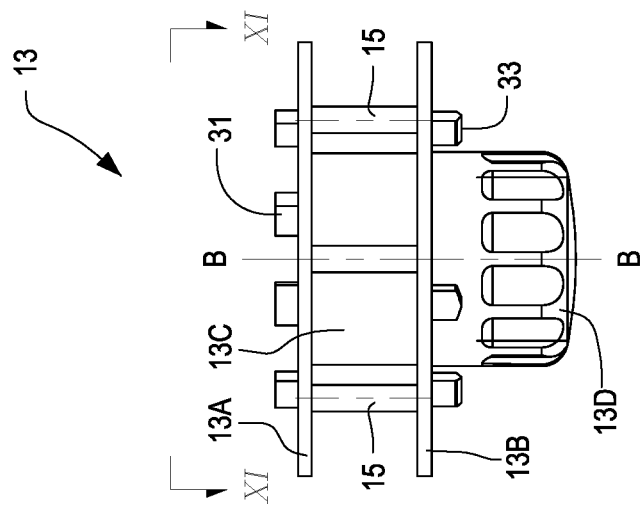
FIG. 9 is a side view of a spool in a possible embodiment.
Figure 10:
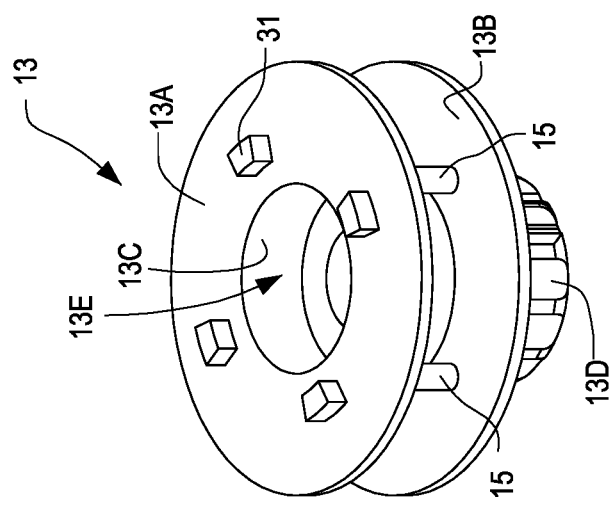
FIG. 10 is an isometric view of FIG. 9.
Figure 11:
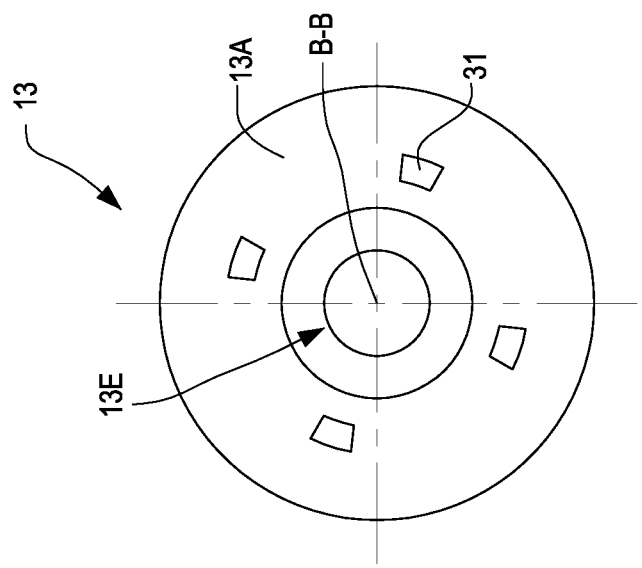
FIG. 11 is a plan view according to XI-XI of FIG. 9.

FIGS. 9 to 11 respectively show a side view, an isometric view and a plan view of the spool 13 separate from the housing 3, in a possible embodiment. The same reference numbers indicated parts already described with reference to the previous FIGS. 1 to 5. The two flanges 13A, 13B are shown, as well as the substantially cylindrical central wall 13C, coaxial with the spool axis B-B, and the four pins 15. Also the knob 13D projecting from the flange 13B is illustrated.

In this embodiment, on the two outer faces of the flanges 13A, 13B teeth 31 and 33 are provided, which are part of the mechanism for the line elongation during use of the trimmer head 1. The elongation mechanism is known per se and will not be described herein. Briefly, it comprises abutments on the inner surfaces of the housing 3, with which the teeth 31 and 33 cooperate, as well as an elastic member axially biasing the spool 13 in the housing 3.

The spool 13 of FIGS. 9 to 11 may be made of plastic and molded in a single piece.

In an inner space, indicated with 13E in FIGS. 10 and 11 and surrounded by the central wall 13C, a connection shaft may be provided for connecting the trimmer head 1 to the drive shaft of a brush cutter or other machine (not shown). Inside the space 13E a spring may be also housed, that pushes the spool 13 against the lower part 3B of the housing 3 and that is part of the elongation mechanism for the cutting line F.

Figure 12:
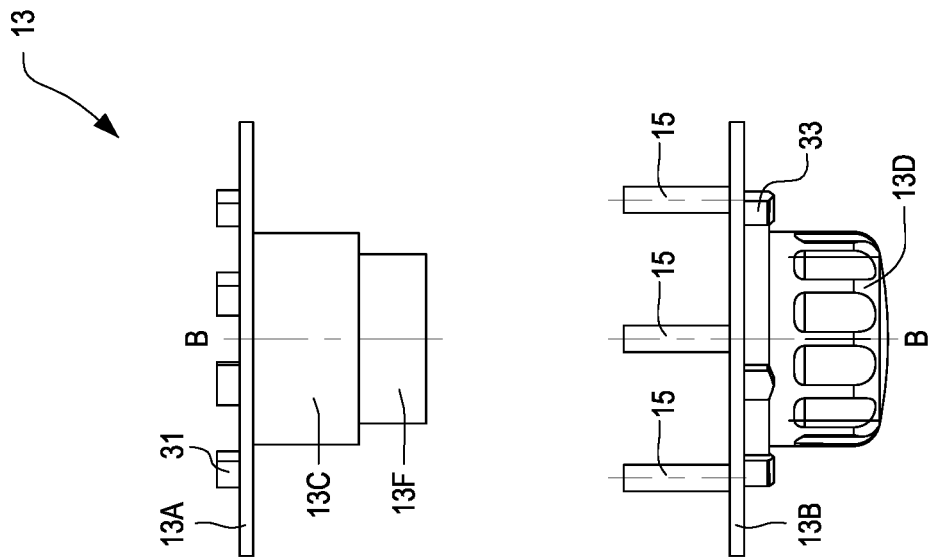
FIG. 12 is a side view of the spool of FIGS. 9 and 11, subdivided into two parts in a possible embodiment.
Figure 13:
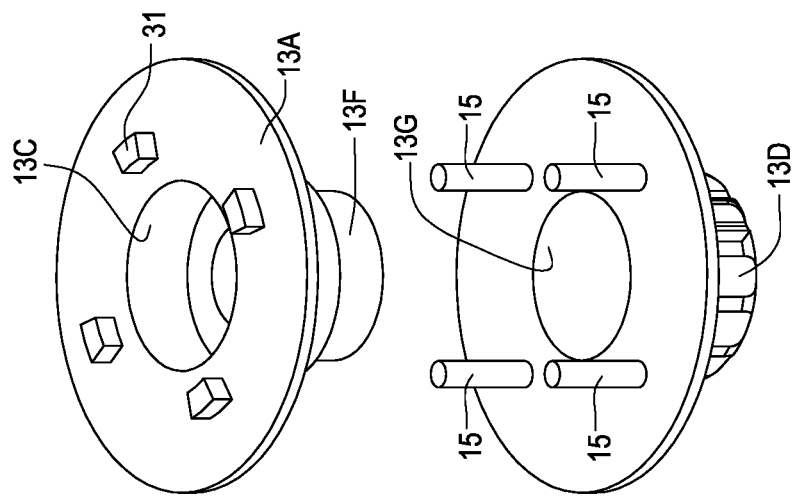
FIG. 13 is an isometric view of the spool of FIGS. 9 and 11, subdivided into two parts in a possible embodiment.

In other embodiments, the spool 13 may be comprised of two separately molded portions which are then joined together by gluing, ultrasonic welding or in any other suitable manner. FIGS. 12 and 13 show respectively a side view and an isometric view of a spool 13 comprised of two portions that can be coupled together and that in FIGS. 12 and 13 are shown separate in an exploded view. The same numbers indicate parts that are identical or equivalent to those already described above.

As shown in FIGS. 12 and 13, in this embodiment the spool 13 is comprised of two portions or parts comprising:
the first portion: the flange 13A, the teeth 31 and the central wall 13C coaxial with the spool axis B-B;
the second portion: the flange 13B, the teeth 33, the knob 13D and the pins 15.

In the illustrated embodiment the wall 13C extends into a shank 13F that is inserted in a hole 13G provided in the lower part of the spool 13. The two portions or parts forming the spool 13 may be connected together by welding the shank 13F of the axial cylindrical wall 13C in the seat 13G.

Figure 14:
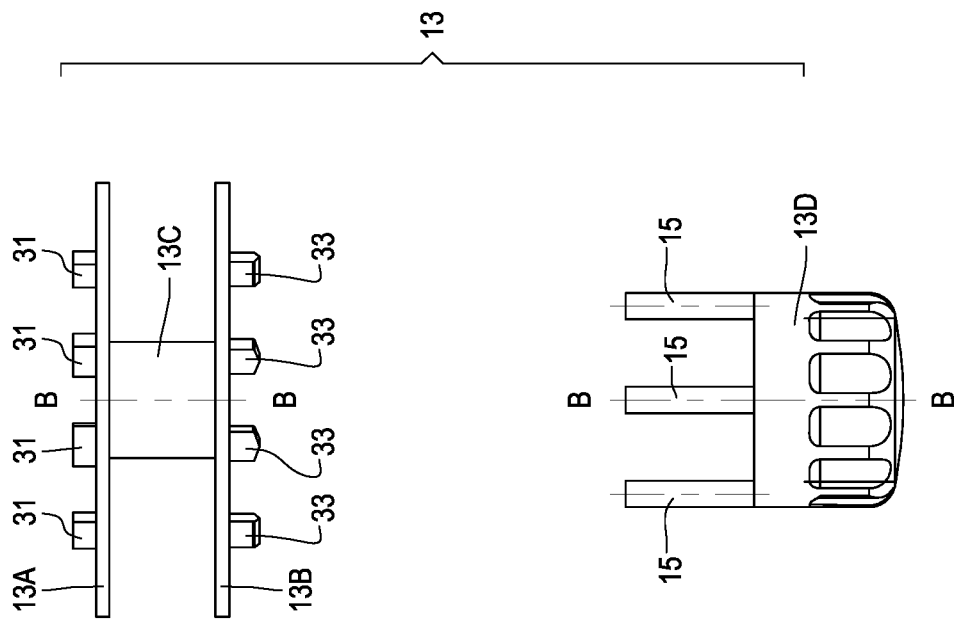
FIG. 14 is a side view of a spool of a different embodiment, subdivided into two parts.
Figure 15:
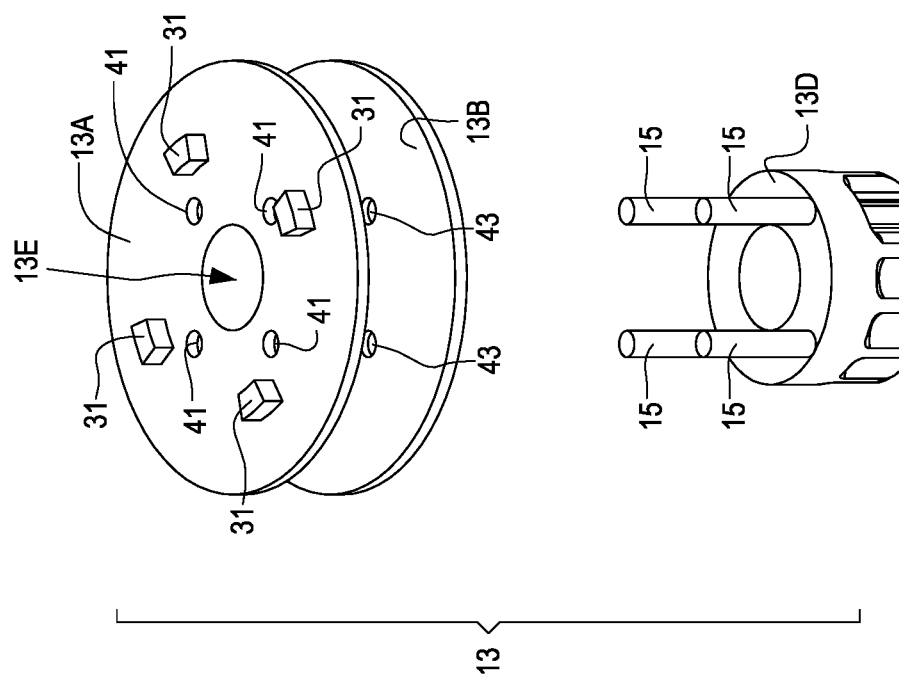
FIG. 15 is an isometric view of the spool of FIG. 14, subdivided into two parts.

The two separately molded and subsequently joined portions of the spool 13 may be divided differently than as illustrated in FIGS. 12 and 13. A modified embodiment is illustrated in FIGS. 14 and 15, showing a side view and an isometric view of the spool 13 disassembled into the two constituents thereof. In this embodiments, a first portion, or part, of the spool 13 comprises the flange 13A, the flange 13B, the approximately central wall 13C, the teeth 31, the teeth 33. Both the flanges 13A and 13B may have through holes 41 and 43 (FIG. 15).

The second portion, or part, of the spool 13 comprises the knob 13D and the pins 15.

The two parts or portions of the spool 13 are joined together for example by welding or gluing, the pins 15 being inserted in the holes 43 and 41 provided in the flanges 13A and 13B. In other embodiments, it is possible to provide only the holes 43, wherein the pins 15 are shorter and are positioned against or very close to the inner surface of the flange 13A.

In the embodiments described above, the pins 15, forming the anchoring elements to anchor the cutting line F to the spool 13, are provided at such a distance from the spool axis B-B that they are outside the central wall 13C provided nearly coaxially to the spool axis B-B. Vice versa, in other embodiments the pins 15, forming the anchoring elements for the cutting line F, may be provided as an integral part of the cylindrical wall 13C. Two exemplary embodiment of this kind of spool 13 are shown in FIGS. 16, 17, and 18, 19 respectively. In these four figures, the same reference numbers indicate elements equal or corresponding to those already described with reference to the previous embodiments and which will not be described again.

Figure 16:
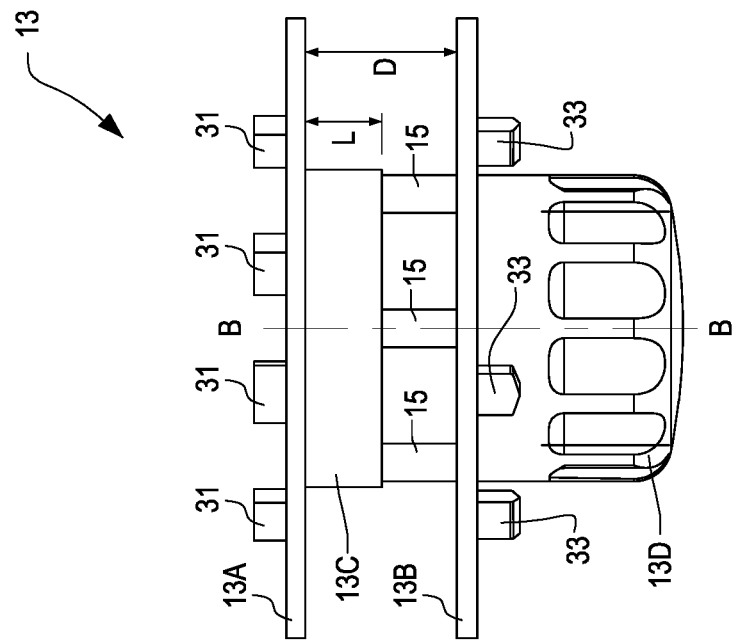
FIG. 16 is a side view of a further embodiment of a spool.
Figure 17:
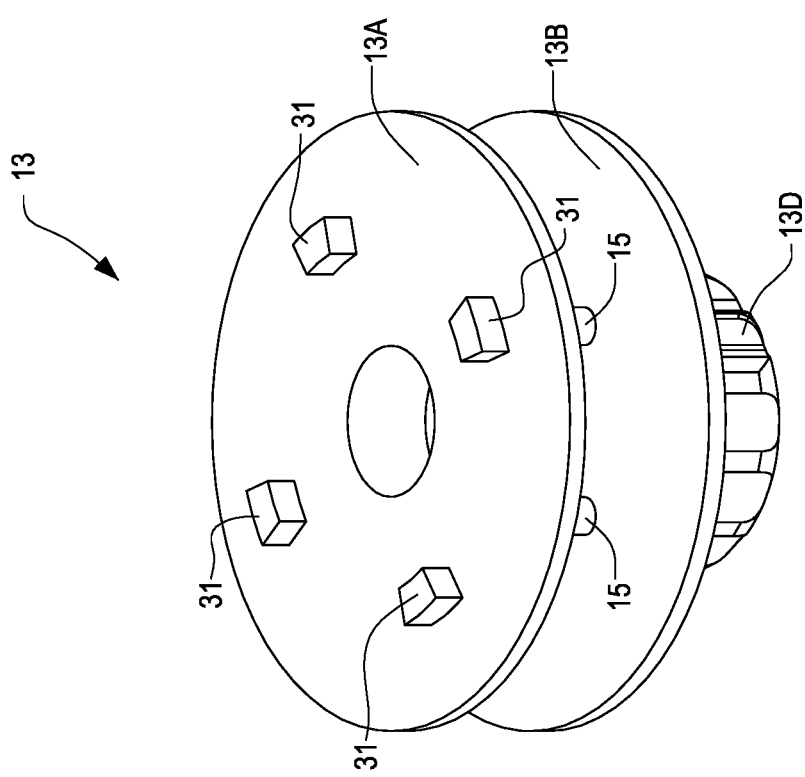
FIG. 17 is an isometric view of the spool of FIG. 16.

In FIGS. 16 and 17, the central wall 13C has an axial length L smaller than the axial distance D between the inner surfaces of the two flanges 13A, 13B. The pins 15 are substantially formed like an extension of the cylindrical wall 13C towards the flange 13B and have a length substantially corresponding to the difference between D and L. Practically, the central wall 13C, coaxial with the spool axis B-B, is provided with four large windows, through which the leading end FT of the cutting line F may pass when the line is inserted through the spool 13 contained in the housing 3, according to the sequence illustrated in FIGS. 6(A)-6©.

Figure 18:
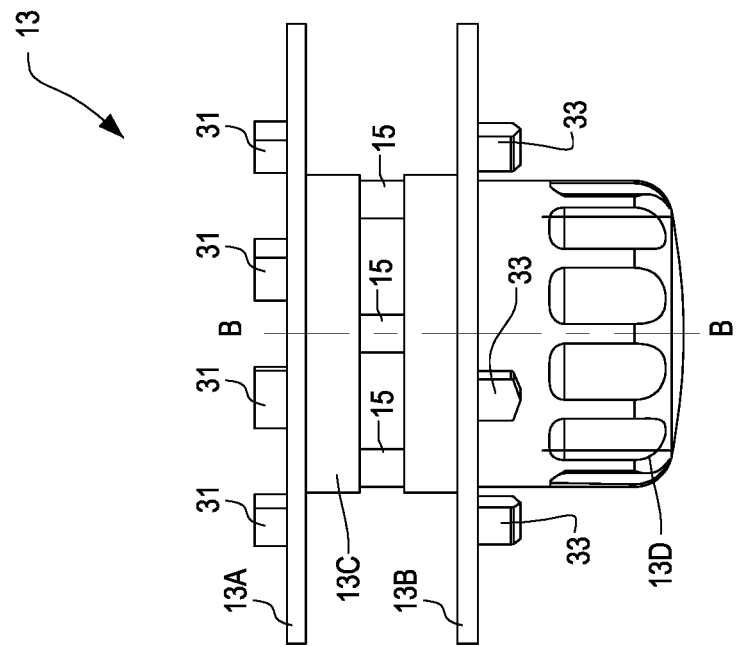
FIG. 18 is a side view of a further embodiment of the spool.
Figure 19:
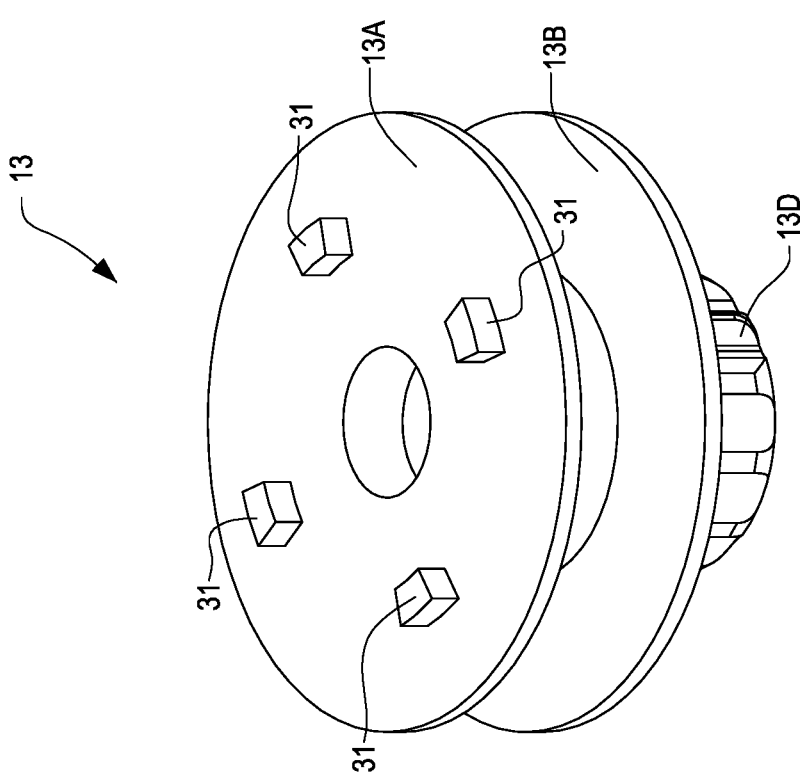
FIG. 19 is an isometric view of the spool of FIG. 18.

FIGS. 18 and 19 show a configuration substantially equivalent to that of FIGS. 16 and 17, with the difference that, in this case, the central wall 13C, coaxial to the axis B-B of the spool 13, is subdivided into two parts projecting from the inner surfaces of the flange 13A and of the flange 13B respectively. The central area of the central wall 13C is interrupted and the two parts of the central wall 13C are joined together by means of pins 15. Therefore, in this configuration the windows delimited by the pins 15 in the cylindrical wall 13C are arranged in an intermediate position of the axial extension of the central wall 13C, instead of being positioned close to the flange 13B as in FIGS. 16 and 17. In other, less advantageous embodiments, the pins 15 may be arranged near the inner surface of the flange 13A.

Figure 20:
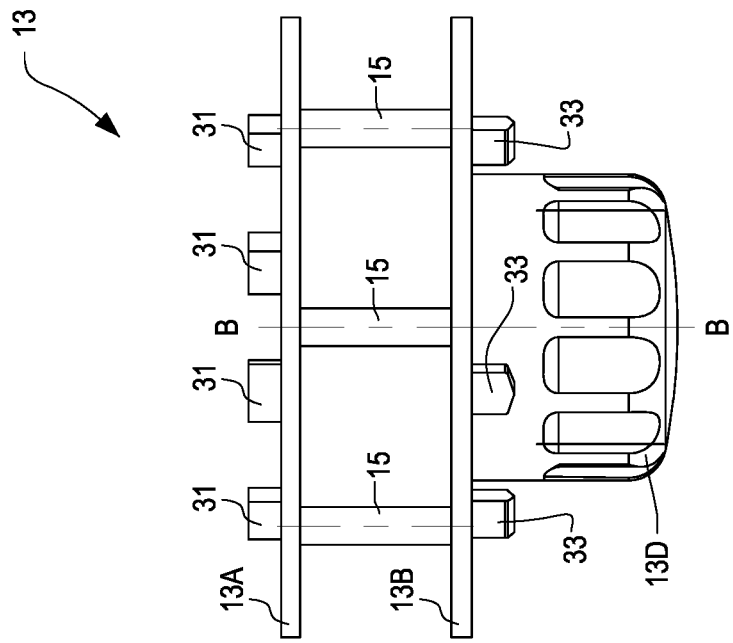
FIG. 20 is a side view of a spool similar to the spool of FIGS. 9 to 11, without an axial inner wall.
Figure 21:
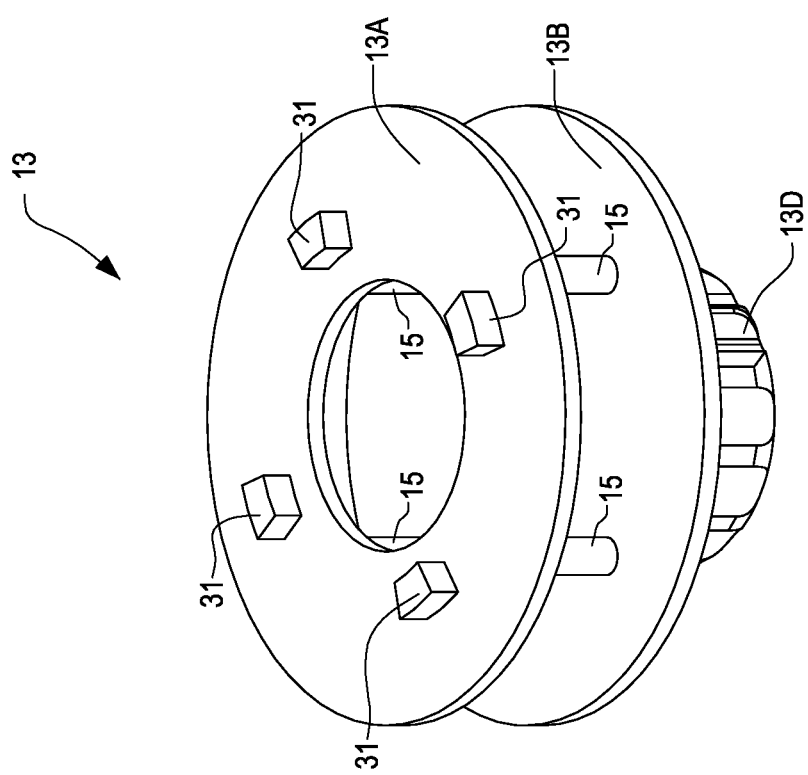
FIG. 21 is an isometric view of the spool of FIG. 20.

As previously stated with specific reference to FIGS. 8(A)-8(D), in some embodiments the spool 13 may be devoid of a central wall 13C coaxial with the spool axis B-B. FIGS. 20 and 21 show a side view and an isometric view of a spool 13 of this kind. The same numbers indicate equal or equivalent parts to those described above, that do not require further detailed explanations. Between the two flanges 13A, 13B only the pins 15 are provided, forming anchoring elements for the cutting line F, while wall 13C is dispensed with.

Figure 22:
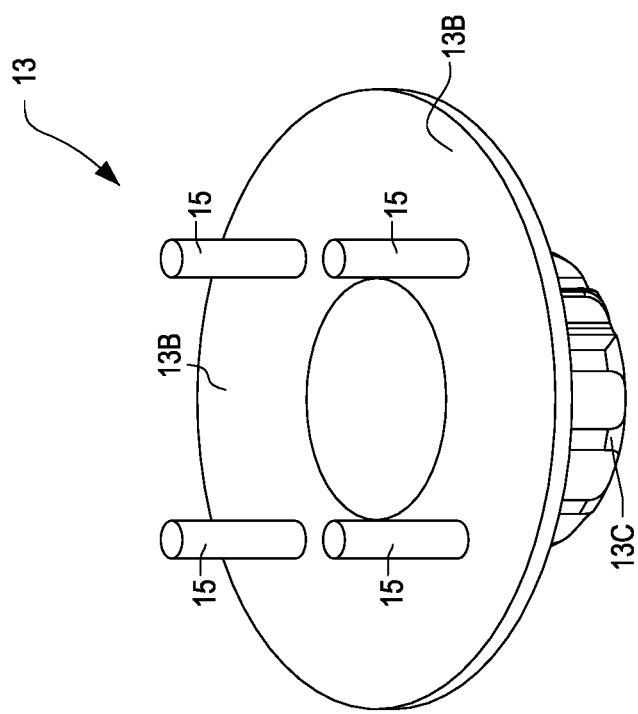
FIG. 22 is a view of a spool similar to the spool of FIGS. 20 and 21 without an upper flange.
Figure 23:
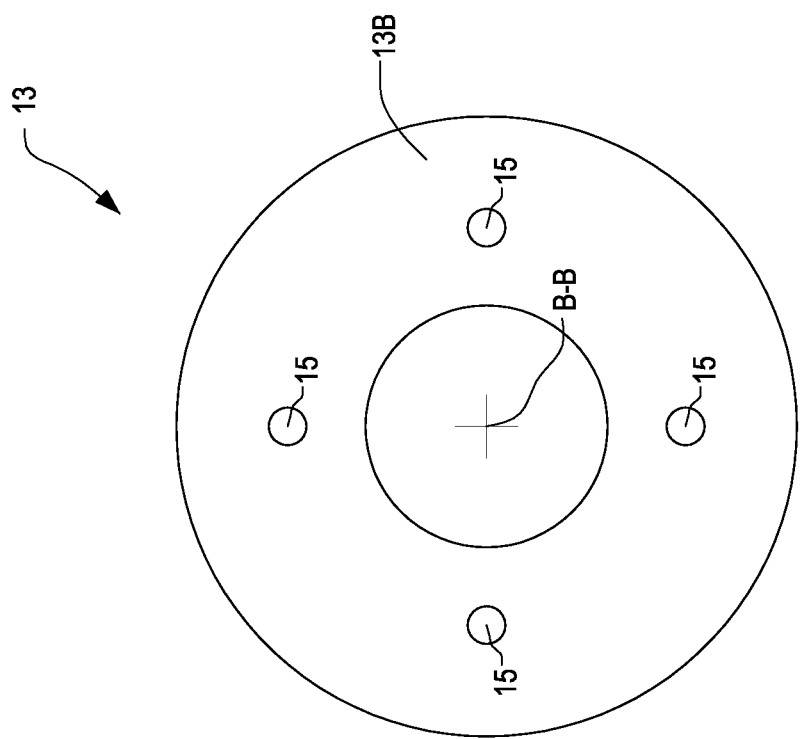
FIG. 23 is a view of a spool similar to the spool of FIGS. 20 and 21 without the upper flange.

FIGS. 22 and 23 illustrate an isometric view and a plan view of a spool 13 without the flange 13A. The flange may be added on top of the pins 15, which form the anchoring elements for the cutting line F, but in some embodiments the flange 13A may be also completely omitted.

Figure 24:
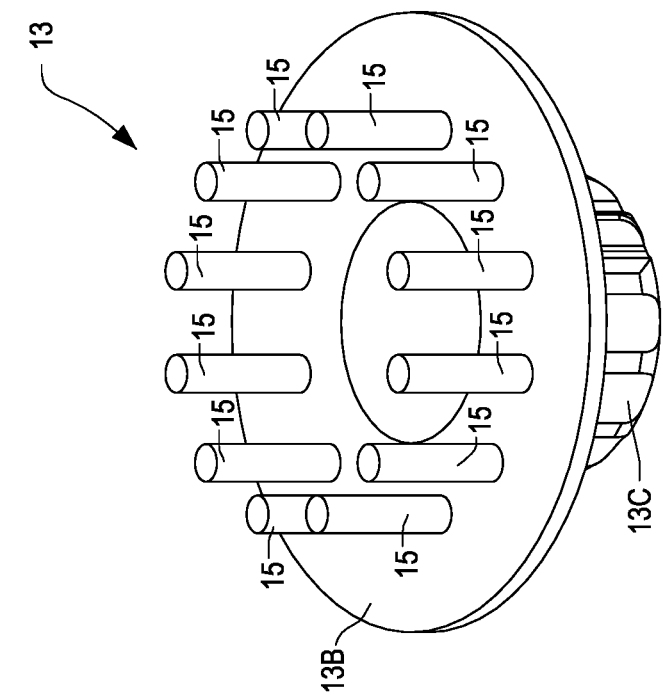
FIG. 24 is a view of a modified embodiment of the spool of FIGS. 22 and 23.
Figure 25:
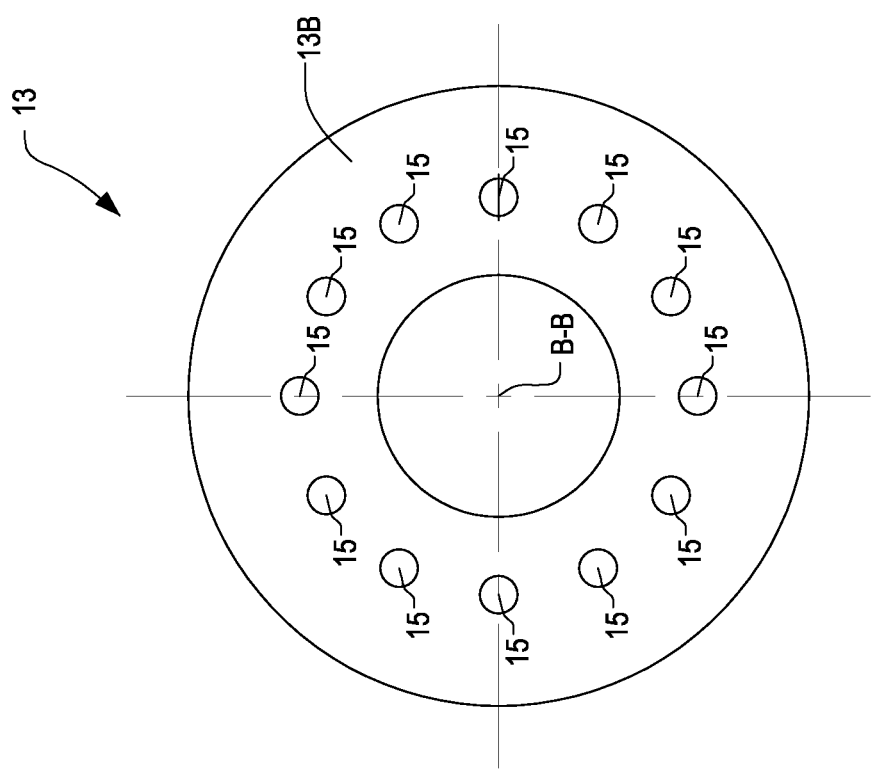
FIG. 25 is a view of a modified embodiment of the spool of FIGS. 22 and 23.

FIGS. 24 and 25 illustrate a modified embodiment similar to that of FIGS. 22 and 23, where, instead of four pins, twelve pins 15 are provided forming twelve anchoring elements for the cutting line F. This arrangement with twelve pins 15, here represented without the flange 13A and without the central wall 13C of the spool 13, may be used also in the other embodiments described above. In further embodiments, a different number of pins 15 may be provided, forming anchoring elements for the cutting line F.

In the figures described above, the line anchoring elements have been represented as pins or columns 15 with a circular cross-section and which extend parallel to the axis B-B of the spool 13 and are arranged according to a circumferential alignment around the axis B-B and spaced from it. This is not the only possible configuration for the anchoring elements for the cutting line F. Namely, they may be, for example, pins with a non-circular cross-section, but rather an elliptical or polygonal cross-section.

Figure 26:
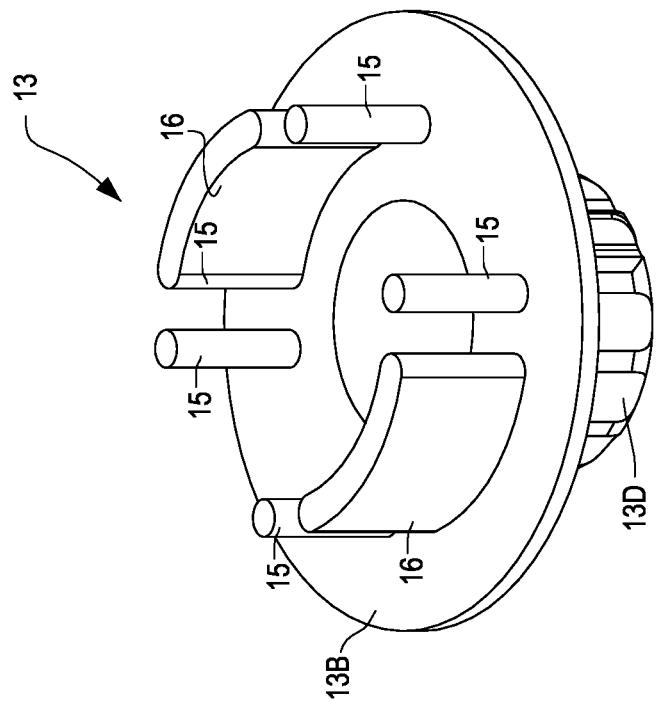
FIG. 26 is a view of a further modified embodiment of the spool of the previous figures.
Figure 27:
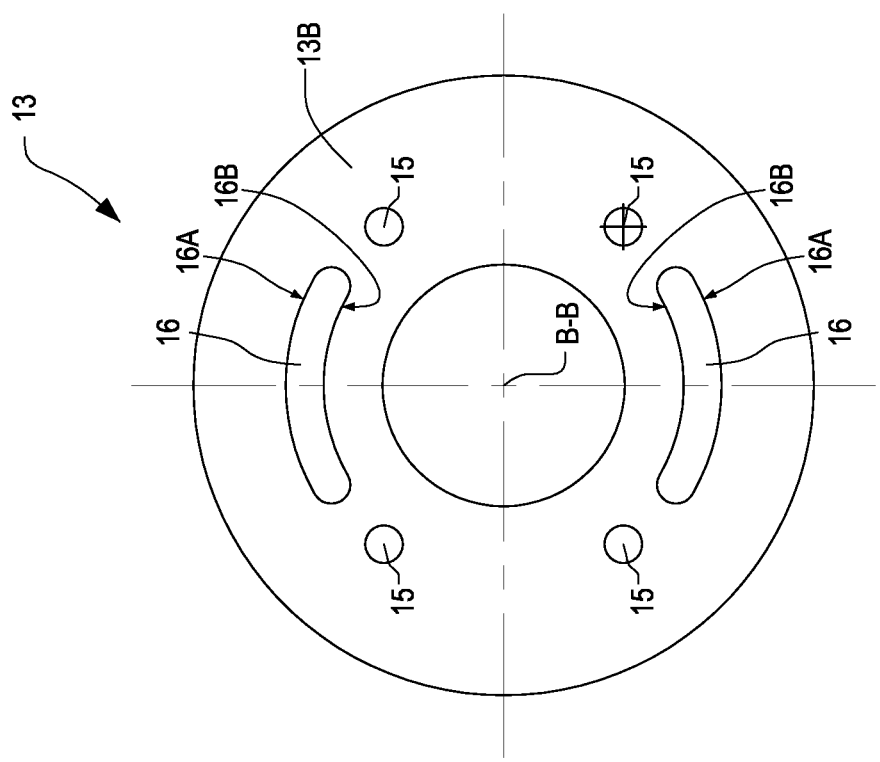
FIG. 27 is a view of a further modified embodiment of the spool of the previous figures.

FIGS. 26 and 27 show respectively an isometric view and a plan view of a spool 13, of which only the flange 13B is shown and which is provided with four pins 15, whose shape is equal to that described above, and with two anchoring elements of different shape for the cutting line F that are indicated with 16. The anchoring elements 16 are approximately fin-shaped and preferably curved, delimited for instance by cylindrical surfaces coaxial with the axis B-B of the spool 13. In FIG. 27 the cylindrical surfaces are indicated with 16A and 16B, respectively.

Figure 28:
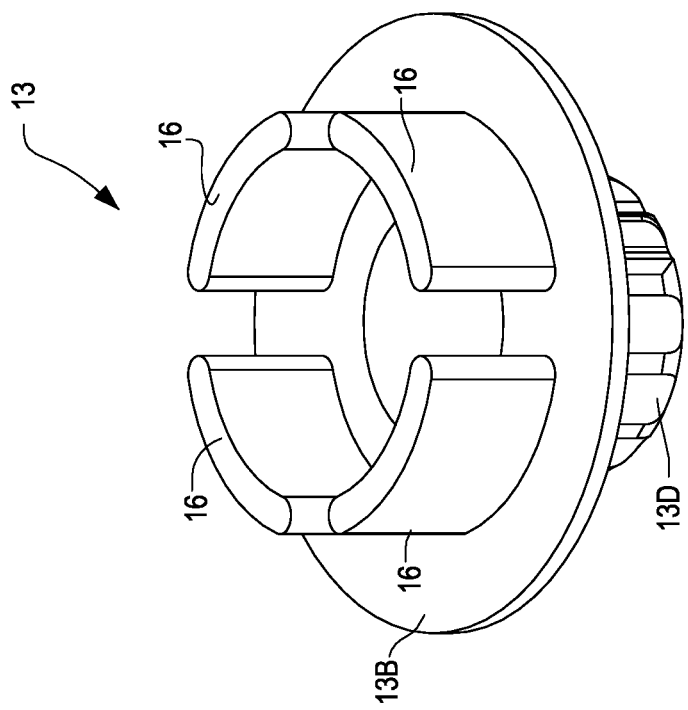
FIG. 28 is a view of a further modified embodiment of a spool for a trimmer head according to the invention.
Figure 29:
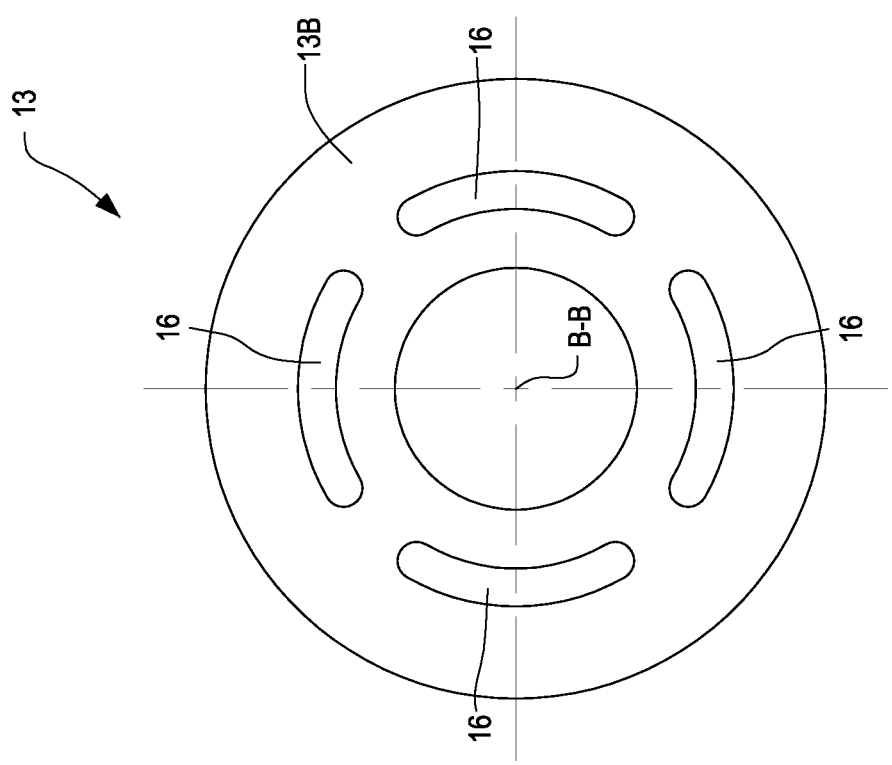
FIG. 29 is a view of a further modified embodiment of a spool for a trimmer head according to the invention.

In modified embodiments, as shown for instance in FIGS. 28 and 29, all the anchoring elements for the cutting line F may be shaped as fin-shaped elements 16, without the use of pin-shaped elements 15.

Even if in FIGS. 26 to 29 the anchoring elements 16 are represented in combination with a spool 13 devoid of a flange 13A and having no central wall 13C, it shall be understood that this modified embodiment of the anchoring elements 16 for the cutting line F may be used also in a spool 13 configured differently, for instance provided with a central cylindrical wall 13C and/or with an upper flange 13A.

Figure 30:
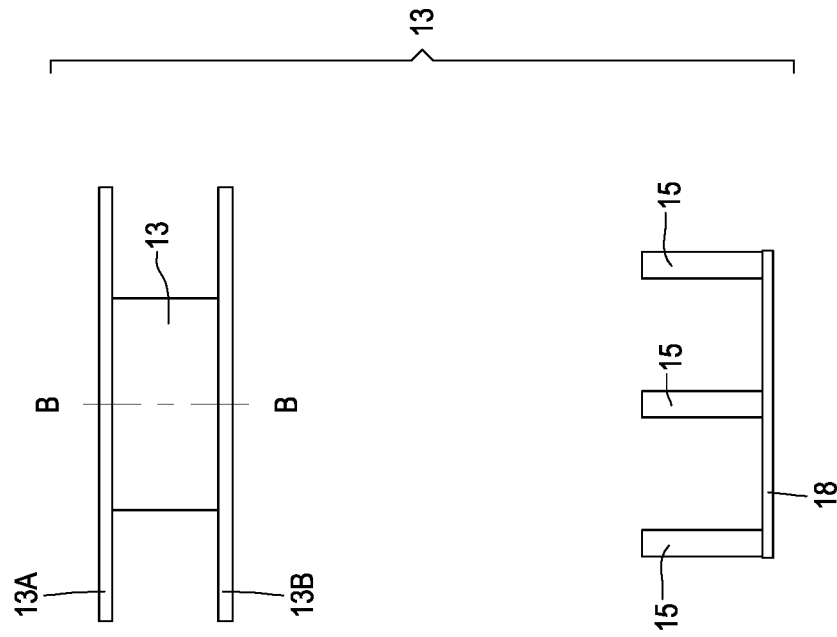
FIG. 30 is a side view of a spool without a control button, with the components thereof disassembled.
Figure 31:
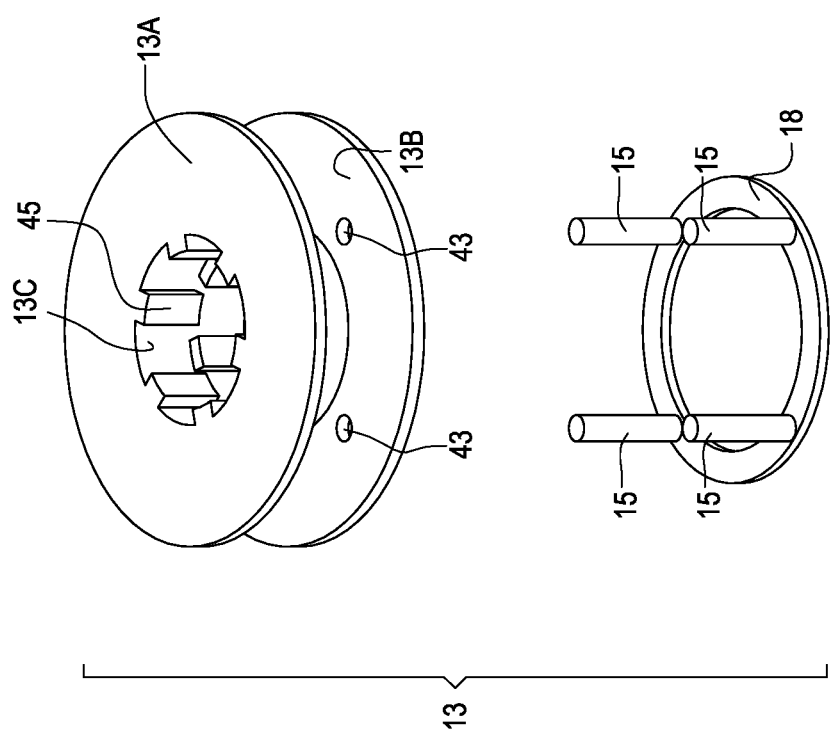
FIG. 31 is an isometric view of the spool of FIG. 30.

FIGS. 30 and 31 show a further modified embodiment of a spool 13 for a trimmer head 1 according to the invention. In this embodiment, the spool 13 is configured in two portions or parts, molded separately and then joined together by welding, gluing or in other suitable manner. It should be understood that, by using a suitable mold, the spool 13 of FIGS. 30 and 31 may be made also in a single piece, with a single molding operation.

In the embodiment of FIGS. 30 and 31, the spool 13 comprises again a flange 13A and a flange 13B spaced from each other and coaxial with the axis B-B of the spool 13. A central wall 13C, for instance cylindrical, may extend between the two flanges 13A, 13B. The spool 13 of FIGS. 30 and 31 is devoid of a knob 13D projecting from the lower flange 13B.

In the embodiment of FIGS. 30 and 31 the anchoring elements 15 for the cutting line F are in the form of pins or columns 15, namely four pins around the axis B-B of the spool 13. Different shapes or different number of anchoring elements may also be provided in this embodiment.

To facilitate the production of the spool 13, the anchoring elements for the cutting line F, formed by the pins 15, may be formed on a component separate from the main body of the spool comprising the flanges 13A, 13B and the central wall 13C. The component comprising the pins 15 may also comprise a ring 18 joining the pins 15 together, so that the latter can be molded in a single piece together with the ring 18 and can be more easily mounted on the pair of flanges 13A, 13B, for example being inserted in through holes 43 provided in the flange 13B (FIG. 31). The two components that, once assembled, form the spool 13, may be joined for instance by welding or gluing, wherein the upper surface of the ring 18 is advantageously made adhere to the outer surface of the flange 13B. The ends of the pins 15 may be made adhere to the inner surface of the flange 13A.

In other embodiments, the pins 15 may be manufactured as separate components, inserted one separately from the other through the through holes 43 and suitably welded or glued to the flange 13B or to both the flanges 13A and 13B.

In the embodiment of FIGS. 30 and 31, the inner surface of the cylindrical wall 13C forms a toothing 45 suitable to cooperate with members, not shown and known in se, contained in the trimmer head 1, to control the gradual elongation of the cutting line F.

Figure 32:
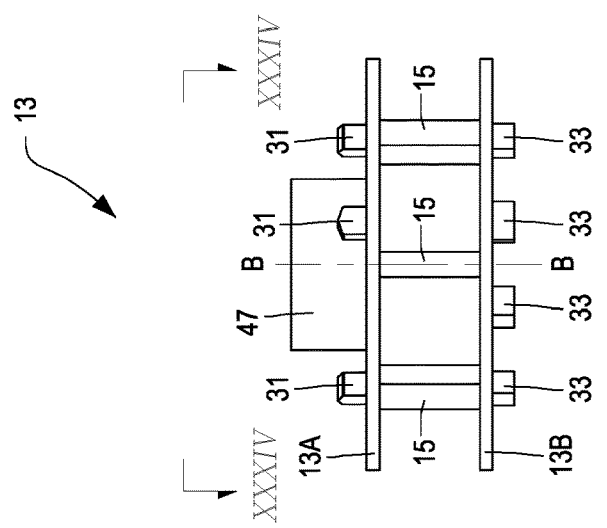
FIG. 32 is a side view of a further embodiment of a spool for a trimmer head according to the invention.
Figure 33:
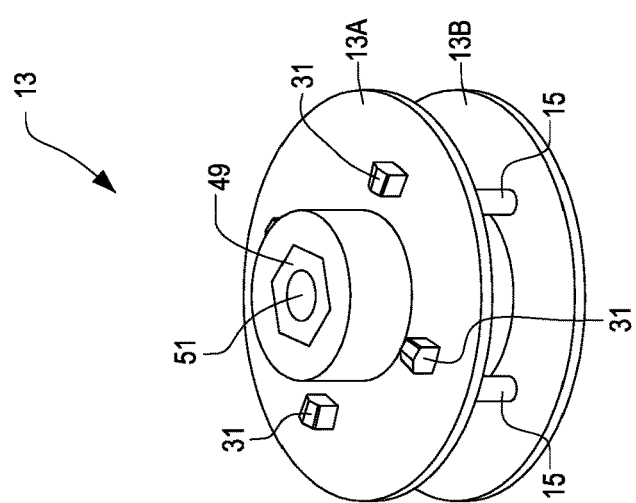
FIG. 33 is an isometric view of the spool of FIG. 32.
Figure 34:
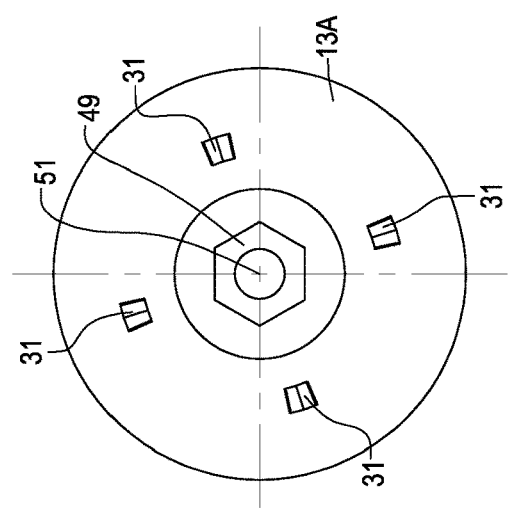
FIG. 34 is a plan view according to XXXIV-XXXIV of FIG. 32.

FIGS. 32, 33 and 34 show a further embodiment of the spool 13 for use in a trimmer head according to the invention. The same reference numbers indicate equal or equivalent parts to that described with reference to the previous embodiments. In this embodiment, a shank 47, containing for instance a metal insert 49 (FIGS. 33 and 34), projects from the outer surface of the flange 13A. The metal insert 49 may have an internally threaded hole 51 to screw the spool directly on a drive shaft of a brush cutter. Instead of a threaded hole 51, a threaded pin may be provided projecting from the insert 49.

As in the previous embodiments, in this case again between the flanges 13A and 13B of the spool 13 anchoring elements for the cutting line F are provided that are indicated with 15 and in this exemplary embodiment are configured like columns or pins. The central wall 13C is provided in a position coaxial with the axis B-B of the spool 13, between the flanges 13A and 13B; the outer diameter of the wall is smaller than the diameter of the line along which the pins 15 are arranged, so as to leave a free space between each pin 15 and the outer surface in the central wall 13C for the purposes described above.

Figure 35:
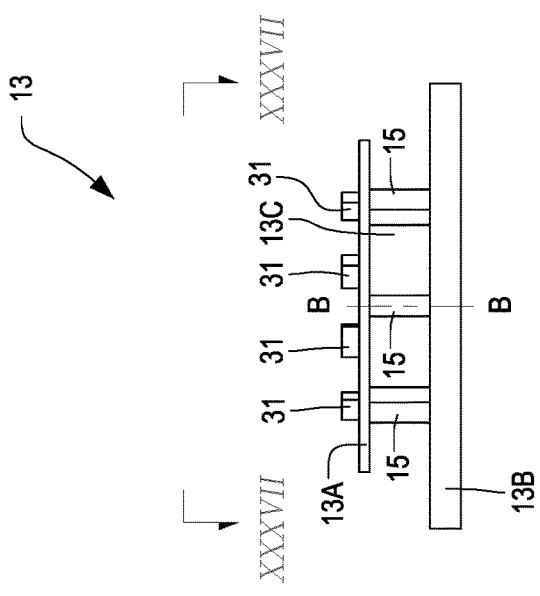
FIG. 35 is a side view of a further embodiment of a spool for a trimmer head according to the invention.
Figure 36:
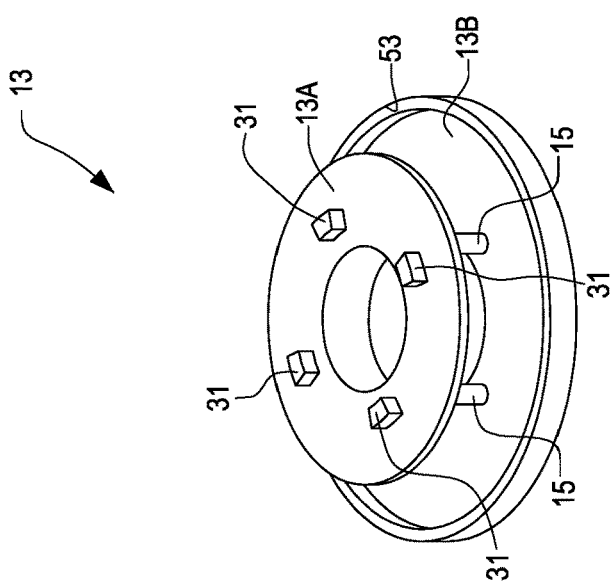
FIG. 36 is an isometric view of the spool of FIG. 35.
Figure 37:
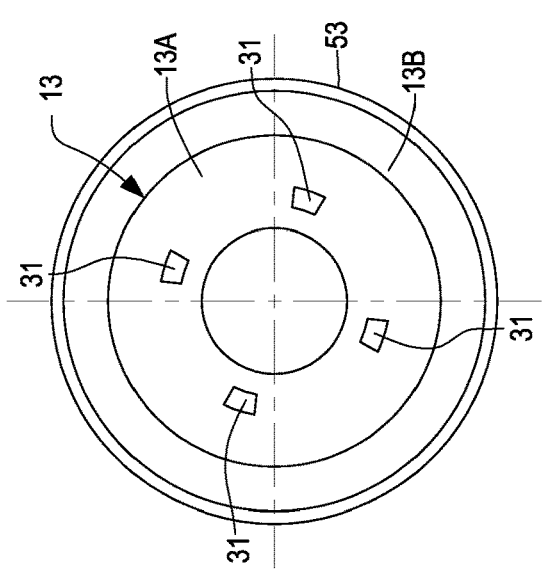
FIG. 37 is a plan view according to XXXVII-XXXVII of FIG. 35.

FIGS. 35, 36 and 37 show a modified embodiment of a spool 13, configured in this case to form, together with the flange 13B, a closing lid for a trimmer head 1. The flange 13B comprises a perimeter edge 53 that may surround the edge of the portion 3A of the housing 3 of the trimmer head. In this case, the housing is closed by a part of the spool 13. In this embodiment again, a central, e.g. cylindrical wall 13C coaxial with the axis B-B of the spool 13 may be provided between the flanges 13A and 13B. Between the two flanges 13A and 13B, pins 15 are provided, forming anchoring elements for the cutting line F.

FIGS. 38, 39 and 40 show a further embodiment of a spool 13 for a trimmer head 1 according to the invention. The same reference numbers indicate identical or equivalent parts to those described above. Also in this case the spool 13 has two flanges 13A and 13B, between which a central. e.g. cylindrical wall 13C extends and is substantially coaxial with the axis B-B of the spool 13. Pins 15 are provided at a radial distance from the outer surface of the wall 13C, and form the anchoring elements for the cutting line F. From the outer surfaces of the two flanges 13A, 13B teeth 31 and 33 project, configured to cooperate with elements integral with the housing 3 of the trimmer head 1, known per se and provided to control the elongation of the cutting line.

Figure 41:
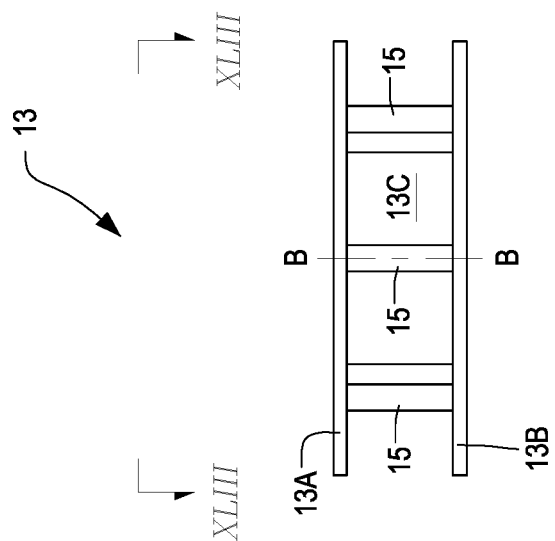
FIG. 41 is a side view of a modified embodiment of the spool of FIGS. 38 to 40.
Figure 42:
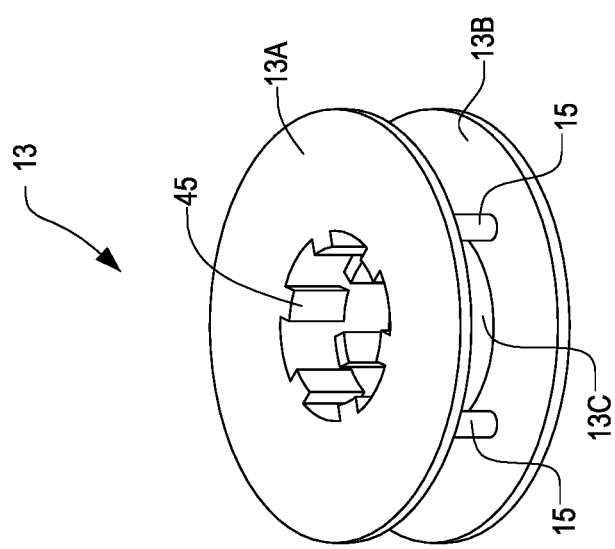
FIG. 42 is an isometric view of the spool of FIG. 41.
Figure 43:
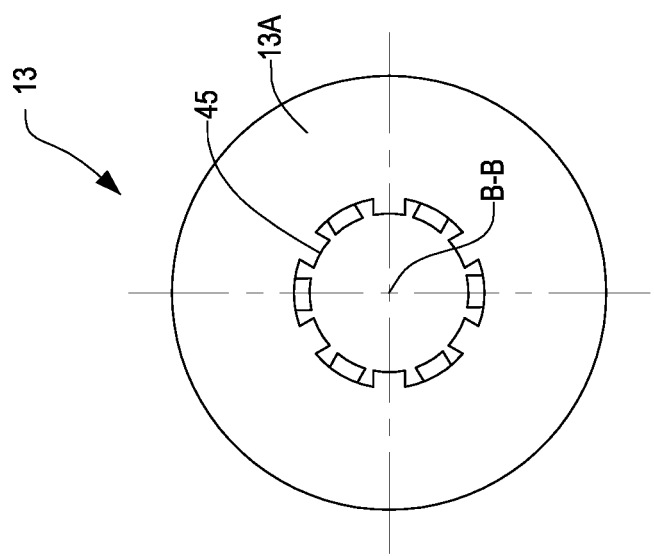
FIG. 43 is a plan view according to XLIII-XLIII of FIG. 41.

FIGS. 41, 42 and 43 show a further embodiment of the spool 13 for a trimmer head according to the invention, wherein the same reference numbers indicate equal or corresponding parts to those described above.

The spool of FIGS. 41 to 43 is substantially similar to the spool of FIGS. 30 and 31, but it is molded in a single piece.

While specific embodiments of the invention have been shown and described in detail to illustrate the application of the principles of the invention, it will be understood that the invention may be embodied otherwise without departing from such principles.

What is claimed is:

1. A trimmer head comprising:
   a rotation axis;
   a housing comprising a side wall surrounding the rotation axis;
   a spool insertable in the housing, the spool being configured and arranged for winding a stock of cutting line therearound by rotating the spool and the housing with respect to each other around the rotation axis, the spool comprising at least a first flange extending around a spool axis;
   at least two cutting line passage holes extending through the side wall for passage of the cutting line from an inside to an outside of the housing, wherein the spool comprises a plurality of cutting line anchoring elements integrally connected with the spool, each of the cutting line anchoring elements extending from the first flange in an axial direction and each of the cutting line anchoring elements being radially spaced from the spool axis, the cutting line anchoring elements being angularly spaced from one another around the spool axis, wherein a cutting line insertion path is formed between adjacent cutting line anchoring elements, wherein mutual rotation of the spool and the housing causes winding of the cutting line around the cutting line anchoring elements;
   a pair of perimeter guides inside the housing for each cutting line passage hole, wherein each perimeter guide comprises a groove facing in a direction of an interior of the housing, each groove extends for an arch of at least 20° in a circumferential direction with respect to the rotation axis, one end of each groove of each pair of perimeter guides being located adjacent to a respective cutting line passage hole and converging towards the respective cutting line passage hole.

2. The trimmer head according to claim 1, wherein the spool axis substantially matches with the rotation axis of the trimmer head when the spool is inserted in the housing.

3. The trimmer head according to claim 1, wherein the at least one anchoring element extends parallel to the spool axis.

4. The trimmer head according to claim 1, wherein the spool comprises a second flange, axially spaced from the first flange, and wherein one or more of the cutting line anchoring elements extend from the first flange to the second flange.

5. The trimmer head according to claim 1, wherein the spool comprises a central wall surrounding the spool axis and extending from the first flange parallel to the spool axis, and wherein one or more of the cutting line anchoring element is associated with the wall.

6. The trimmer head according to claim 5, wherein the cutting line anchoring elements are integrated in the wall, the wall having openings intercalated between the cutting line anchoring elements.

7. The trimmer head according to claim 5, wherein the anchoring elements are arranged radially outside the wall.

8. The trimmer head according to claim 1, wherein the perimeter guides are provided on inserts arranged in the housing of the trimmer head.

9. The trimmer head according to claim 1, wherein each pair of perimeter guides is provided in an insert comprising a central portion forming an exit bushing for the cutting line.

10. The trimmer head according to claim 9, wherein each insert is formed by a component separate from the housing and adapted to be applied inside the housing.

11. The trimmer head according to claim 1, wherein each insert has a central body projecting radially, through which a cutting line opening extends, the central body being configured and arranged so as to be inserted in the corresponding cutting line passage hole and to be retained therein.

12. The trimmer head according to claim 1, wherein one or more of the anchoring elements are formed by one of a pin extending substantially parallel to the spool axis and a fin-shaped component.

13. The trimmer head according to claim 1, wherein the line anchoring elements are molded in a single piece with the first flange of the spool.

14. The trimmer head according to claim 1, wherein the anchoring elements are provided on a component of the spool, molded separately from the flange and applied thereto.

15. A method to wind a stock of cutting line in a trimmer head having an axis of rotation, a housing with at least two cutting line passage holes in a side wall surrounding the axis of rotation, and a spool housed in the housing and comprising at least a first flange and a plurality of anchoring elements for the cutting line, each of the anchoring elements being integral with the first flange and each of the anchoring elements extending from the first flange in the direction of a spool axis and each of the anchoring elements being spaced from the spool axis, the cutting line anchoring elements being angularly spaced from one another around the spool axis, wherein a cutting line insertion path is defined between adjacent cutting line anchoring elements, the method comprising the following steps:
   inserting an end of the cutting line through one of the at least two cutting line passage holes and through the insertion path between adjacent anchoring elements;
   guiding the line end between the rotation axis of the trimmer head and at least one of the anchoring elements, and along a groove facing in the direction of the interior of the housing, such that a leading end of the cutting line is diverted, towards the second of the two cutting line passage holes, wherein the groove extends for an arch of at least 20° in a circumferential direction with respect to the rotation axis, and one end of the groove is located adjacent to another one of the at least two cutting line passage holes;

inserting the cutting line end through the second cutting line passage hole and making the cutting line exit from the housing through the second cutting line passage hole;

sliding a quantity of cutting line through the housing;

winding a length of the cutting line on the spool by rotating the spool inside the housing with respect to the two cutting line passage holes, so as to form, on the spool and around the anchoring elements, a series of line turns wound around the at least one anchoring element, and to constrain the cutting line to the spool at an intermediate portion of the length of cutting line, leaving two line segments projecting outside the housing through the two cutting line passage holes.

16. The method according to claim 15, wherein the spool comprises a central wall extending from the first flange substantially parallel to the rotation axis, and the cutting line is made pass between the wall and the at least one anchoring element.

\* \* \* \* \*